United States Patent [19]

Hashimoto et al.

[11] Patent Number: 5,463,512

[45] Date of Patent: Oct. 31, 1995

[54] MAGNETIC DISK APPARATUS

[75] Inventors: Akira Hashimoto; Hiroshi Miwa, both of Kanagawa, Japan

[73] Assignee: Mitsubishi Denki Kabushiki Kaisha, Tokyo, Japan

[21] Appl. No.: 299,325

[22] Filed: Aug. 31, 1994

Related U.S. Application Data

[63] Continuation of Ser. No. 900,063, Jun. 16, 1992, abandoned.

[30] Foreign Application Priority Data

| Jun. 19, 1991 | [JP] | Japan | 3-147386 |
| Feb. 15, 1992 | [JP] | Japan | 4-028681 |
| Feb. 15, 1992 | [JP] | Japan | 4-059090 |
| Jun. 12, 1992 | [JP] | Japan | 4-153688 |

[51] Int. Cl.$^6$ .............................. G11B 5/48; G11B 5/54
[52] U.S. Cl. .............................. 360/104; 360/105
[58] Field of Search .............................. 360/105, 106, 360/104, 107, 99.06, 99.02, 137; 369/247, 13, 292, 244, 249, 215, 219

[56] References Cited

U.S. PATENT DOCUMENTS

| 4,777,551 | 10/1988 | Seki et al. | 360/104 |
| 4,855,851 | 8/1989 | Radwan et al. | 360/104 |
| 4,987,507 | 1/1991 | Steltzer | 360/104 |
| 5,202,863 | 4/1993 | Miyatake et al. | 360/103 |

FOREIGN PATENT DOCUMENTS

| 33809 | 8/1981 | European Pat. Off. | 360/104 |
| 208605 | 1/1987 | European Pat. Off. | 360/104 |
| 56-159864 | 12/1981 | Japan | 360/104 |
| 57-172568 | 10/1982 | Japan | 360/104 |
| 63-87672 | 4/1988 | Japan | 360/104 |
| 63-249962 | 10/1988 | Japan . | |
| 2-66785 | 3/1990 | Japan | 360/104 |
| 2-152075 | 6/1990 | Japan . | |
| 3-105771 | 5/1991 | Japan . | |
| 5-36199 | 2/1993 | Japan | 369/13 |

OTHER PUBLICATIONS

IBM Technical Disclosure Bulletin, vol. 19, No. 9, Feb. 1977, pp. 3577 and 3578.

*Primary Examiner*—John H. Wolff
*Assistant Examiner*—Allen Cao
*Attorney, Agent, or Firm*—Wolf, Greenfield & Sacks

[57] ABSTRACT

A magnetic disk apparatus having an upper head on a head arm and a lower head on a head carriage, the head arm is rotatably mounted between a lower position where the heads are able to write and read to/from the disk and an upper position where the heads remove from the disk, which apparatus comprises an arm load board which supports the head arm axially on the disk holder and is able to rotate in rotating direction of the head arm, damper member for giving a reaction force against the rotating direction of the arm load board, and a spring member for pressing the head arm towards the lower position.

14 Claims, 29 Drawing Sheets

MAGNETIC DISK APPARATUS

This application is a file wrapper continuation of application Ser. No. 07/900,063 filed Jun. 16, 1992 now abandoned.

BACKGROUND OF THE INVENTION

The invention relates to a magnetic apparatus, more particularly to an elevation apparatus having a soft landing mechanism for landing the head on the recording medium, a reference position detection mechanism and a carriage mechanism for moving the magnetic head.

FIG. 6, FIG. 7, FIG. 8 and FIG. 9 show a conventional elevation apparatus as taught in the laid-open Japanese patent publication No. 2- 152075.

In the figures, a head carriage 1 comprises a lower mounting portion 2 and an arm mounting portion 3 which are clamped by a screw 4 and a nut 5. A guide groove 6 is formed on a lower protruding portion of the lower mounting portion 2. A guide rod ( not shown) is inserted in the guide groove 6. The head carriage 1 is guided by the guide rod and able to move in the radial direction of a disk 7.

A head arm 8 comprises an upper head mounting portion and a blade spring 10. At one side of the blade spring 10, an upper mounting portion 9 is fixed. At another side of the blade spring 10 is fixed the arm mounting portion 3. The head arm 8 is supported by the blade spring 10 so that it is able to rotate against the head carriage 1. An upper head 11 and a lower head 12 are mounted at opposing positions on the upper mounting portion 9 and the lower mounting portion 2, respectively. The upper head 11 is able to move up and down by the curving of the blade spring 10. At the down position of the upper mounting portion 9, the upper head 11 and the lower head 12 contact both the surfaces of the disk 7, where the recording medium is at the state of being able to be read and written to. At the up position of the upper mounting portion 9, the upper head 11 and the lower head 12 are removing from both the surfaces of the disk 7, where the disk 7 may move between the two dot chain line showing the disk insertion position and the solid line showing the disk mounting position.

As shown in FIG. 8, a damper mechanism 13 comprises a slide room 14 opening on the upper side of the upper head mounting portion 9 and a slider 15 arranged so as to move freely in the slide room 14. The high viscosity agent such as silicon grease is filled between the slider 15 and the slider room 14. On the slider 15, a groove 16 is formed for inserting an end of a torsion coil spring 17. The torsion coil spring 17 is supported at a spring holding portion 18 of the arm mounting portion 3. The head arm 8 is moved downwards by the spring force of the torsion coil spring 17. That is, the torsion coil spring 17 is a connection member for connecting the slider 15 with the arm mounting portion 3 as well as the moving mechanism for moving the head arm 8 downwards. The blade spring holding portion 18 is arranged at a different position from the other end of the blade spring 10 which is the rotation supporting point of the head. The slider 15 slides in the slide room 14 for a predetermined distance during the rotation of the head arm 8.

As shown in FIG. 9, two protruding walls 20 are formed in the slide room 14 in the sliding direction. In the slider, two grooves 21 are formed corresponding to the protruding walls 21. Two holder engaging portions 22 are protruding at both sides of the upper head mounting portion 9 and engage the disk holder (not shown in the figure). The disk holder goes up and down between the inserting position and the mounting position of the disk. When the disk is at the inserting position, the holder engaging portion 22 contacts on the upper surface of the disk holder, and the head arm 8 is located at the upper position as shown in FIG. 6. When the disk is at the mounting position, the holder engaging portion 22 removes from the upper surface of the disk holder, and the head arm 8 is located at the lower position by the force of the torsion coil spring 17 as shown in FIG. 7.

The operation of the conventional disk apparatus is explained here. When the disk holder is in the disk inserting position and the head arm 8 is in the upper position, if the disk 7 is inserted into the disk holder, the disk holder immediately moves to the disk mounting position from the two dot chain line to the solid line as shown in FIG. 6. The holder engaging portion 22 removes from the upper surface of the disk holder and the head arm 8 rotates downwards.

The slider 15 slides in the sliding room 14 against the resistance of the high viscosity agent along with the rotation of the head arm 8. Since the slider 15 slides against the resistance of the high viscosity agent, the head arm 8 also rotates downward in response to the slider 15 and the upper head 11 lands slowly on the upper surface of the disk 7.

The duration Td (called "head landing time" below) during which the head arm 8 moves from the upper position to the upper surface of the disk 7 and the upper head 11 moves to the landing position must be within a predetermined time.

As the conventional head elevation apparatus is constructed described above, the head landing time Td becomes unstable because it is decided by the viscosity resistance applied to the slider 15 and the spring force such as the torsion coil spring 17 which rotates the head arm 8 downwards. Accordingly, it is difficult to obtain a desired head landing time Td. This is because the viscosity resistance and the spring force cannot be set independently. In this construction, the viscosity resistance is proportional to the spring force such as a torsion coil spring 17 which compresses the high viscosity agent between the sliding room 14 and the slider 15. Since the viscosity resistance and the spring force acting on the head arm 8 cannot be set independently, the upper head 11 sometimes cannot contact the disk 7 with a desired contact force. As a result, it is difficult to record or reproduce the data correctly.

When the head arm 8 rotates downwards, the slider 15 sometimes removes from the sliding room 14. In that case, the viscosity resistance does not act well on the slider 15 and also the upper head 11 does not land slowly on the disk 7. Further, since the damper mechanism is mounted in the head arm 8, it has been difficult to make the head arm 8 thin and also to make the disk apparatus thin.

Optical sensors are sometimes used as means for detecting the position of the reference track (the outerest track 00 is generally referred as a reference track in the magnetic disk apparatus). FIG. 17 is a plan view of one of the example of the track 00 position detecting mechanism in the magnetic apparatus disclosed in the laid-open Japanese patent publication No. 3-71459.

In the figure, 701 is a magnetic medium for storing the data. 702 is a magnetic head for recording or reproducing the data on the magnetic medium 701. 703 is a head carriage for holding the magnetic head 702. 704 is a head driving motor for reciprocating the head carriage 703 to the target track in the radial direction on the magnetic medium 701. 705 is a lead screw for converting the driving torque of the head driving motor 704 to driving force toward the linear direction of the head carriage 703. 706 is a guide rod for guiding the head carriage 703 toward the radial direction on the magnetic medium 701. 707 is a torsion coil spring 17 for applying force to the head carriage 703 so as to cause the magnetic head 702 to contact with the magnetic medium 701.

708 is a track sensor for detecting the track position 00 by an optical sensor. 709 is a light shielding flag which protrudes perpendicular from the head carriage 703 outward and moves toward the track sensor 708 in order to shield the light. 710 is a sensor mounting board for mounting the optical sensor 708. 710a is a positioning long hole for adjusting position of the sensor mounting board 710. 711 is a positioning pin. 712 is a screw for fixing the sensor mounting board 710 after adjusting it. 713 is an assembling screw for assembling the head carriage 703. 714 is a frame for assembling the head driving motor 704.

FIG. 18 is a side view showing the positional relation between the track sensor 708 for detecting position of the track 00 and the shielding flag 709 which protrudes from the portion of the head carriage 703. 715 is a light emitting element. 716 is a receiving element for converting the received light to a voltage.

The operation of the conventional apparatus is explained here. In FIG. 17, the head carriage 703 holding the magnetic head 702 is assembled by the assembling screws 713. The head carriage 703 forced by the torsion coil spring 707 and makes the magnetic head 702 contact the magnetic medium 701 so as to read and write the data. The head carriage 703 is connected by the lead screw 705 which is connected to the driving motor 704. The rotating motion of the head driving motor 704 is converted to the linear motion where the head carriage 703 moves. The head carriage 703 moves reciprocally toward the radial direction for the concentric circle of the track formed on the magnetic medium 701.

In order for the magnetic head 702 to read and write precisely the data on the target track, it is necessary to position the head by controlling the distance from the reference track 00 at the most outer circle. Therefore if the reference track 00 is not detected precisely, the data cannot be read and written correctly. In such a case, the reliability of the magnetic disk is lost. For avoiding this disadvantage, the optical track sensor 708 comprises the light emitting element 715 and the receiving element 716 which are arranged at the opposite side of its concave portion as shown in FIG. 17. The light shielding flag 709 which moves together with the head carriage 703 is inserted horizontally between the light emitting element 715 and the receiving element 716 so as to detect the track 00.

The end surface of the light shielding flag 709 is parallel to the moving direction of the head carriage 703. The light shielding flag 709 cuts or passes the light from the light emitting element 715 and an output voltage is generated in accordance with the light quantity received in the receiving element 716. If the track sensor 708 is mounted without adjusting its location, the light shielding flag 709, which moves together with the head carriage 703, relatively drifts from the optical sensor 708 by the influences such as the element tolerance and the assembling error. Therefore, it is difficult to correctly position the track sensor 708. Accordingly, it is necessary to adjust the track sensor 708 toward x direction which is the same moving direction of the head carriage 703. The track sensor 708 is adjusted as follows. The track sensor 708 is mounted on the sensor mounting board 710 and then the track sensor 708 is moved toward x direction so that the positioning long hole 710a moves along with the positioning pin 711 which is protruding from the frame 714. When the output voltage of the optical sensor 708 reaches to the target voltage, the adjusting is finished to decide the point to be a track 00 and the mounting screw is fixed to the frame 714.

Since the conventional reference track detection mechanism is constructed as described above, when adjusting the track sensor, adjusting the range toward the carriage movement influences directly the depth dimension. That is, the reference track position detection mechanism of the conventional magnetic apparatus needs to ensure the adjusting distance at the back of the head carriage. Accordingly it is difficult to make the depth dimension short and to make the apparatus small in size.

FIG. 31 is a perspective view of a conventional flexible magnetic disk apparatus (FDD) disclosed in the laid-open Japanese patent publication No. 63-225966. FIG. 32–FIG. 33 are brief sectional views of FIG. 31. In the figures, 601 is an assembled body (disk jacket) comprised of a disk, a jacket case having a window for recording and reproducing the data and a shatter for opening or closing the window. 602 is an FDD. 603 is a spindle motor for rotating the disk mounted on the disk mounting surface 603a. 603b is a spindle shaft protruding from the center of the spindle motor 603 higher than the disk mounting surface 603a for positioning the disk. 604 is an S0 head, 605 is an S1 head. 606 is a carriage for holding the S0 head 604. 607 is an S1 arm mounting the S1 head 605 at its one end for rotating against the carriage 606. The other end of the S1 arm 607 is mounted at the carriage 606 via a blade spring 608.

In the conventional FDD 2, the diskette 601 is inserted horizontally against the disk mounting surface 603a of the spindle motor 603 and then mounted to the spindle motor 603.

Since the conventional FDD is constructed as described above, it is difficult to make the apparatus thin. The reason is explained using FIG. 33 below. When the diskette 601 is inserted horizontally against the disk mounting surface 603a, the insersionable height is H1 which is the distance between the apex of the spindle shaft 603b and the lower end of the S1 head 605. When the diskette 601 is inserted obliquely with the angle $\Theta$ against the disk mounting surface 603a, the insersionable height is H2 as shown in FIG. 33. The relation between H1 and H2 becomes H1<H2, therefore it is easily understood that inserting the diskette 601 obliquely into FDD has a height advantage over inserting the diskette 601 horizontally. When the diskette 601 is inserted with the angle $\Theta$ into FDD, the height of the FDD becomes thinner by about H-2 cos $\Theta$–H1.

Although it is able to make the apparatus thinner if the diskette 601 is inserted obliquely against the disk mounting surface 603a, the diskette 601 crushes the S0 head 604 as shown in FIG. 34. Since the conventional apparatus has no soft landing mechanism in which the S1 head 606 lands slowly on the disk, the head is apt to give a flaw to the disk and head.

It is an object of the present invention to obtain stable landing time Td.

It is also an object of the present invention to provide a soft landing mechanism which gives a desired contact force between the upper head and the disk for obtaining a thin type magnetic disk apparatus.

It is a further object of the present invention to provide a short depth dimension and a small size apparatus and also to provide a mechanism for easily adjusting the apparatus.

It is still a further object of the present invention to provide a safety carriage mechanism in which the diskette does not crash to the S0 head if the diskette is inserted obliquely against the disk mounting surface of the spindle motor.

It is more over an object of the present invention to provide a carriage mechanism having a soft landing mechanism in which a head lands slowly on the disk.

SUMMARY OF THE INVENTION

According to one aspect of the present invention, there is provided a magnetic disk apparatus having an upper head and a lower head at a facing position of a head arm and a head carriage, respectively, the head arm is rotatably mounted between a lower position where the heads are able to write and read to/from the disk and an upper position where the heads remove from the disk, and spring means for pressing the head arm to the lower position, the apparatus comprises: an arm load board which supports the head arm axially supported on the disk holder and is able to rotate toward the rotating direction of the head arm; damper means for giving a reaction force against the rotating direction of the arm load board; and a head arm adjusting screw for pressing the arm load board to closely contact the disk holder.

Preferably the arm load board indicates U shape, the bottom portion of the arm load board is axially supported on the disk holder, both sides of the arm load board have head arm adjusting screws provided on the both blades of the head arm.

A magnetic disk apparatus may comprise a head arm spring engaged with a pair of hooks provided on the disk holder and having an axis portion and a spring portion, the axis portion axially supports the arm load board and the spring portion presses the arm load board to closely contact the disk holder.

According to a second aspect of the present invention a magnetic disk apparatus is provided having a magnetic disk for storing data, a magnetic head for reading and writing from/to the magnetic disk, a head carriage for mounting the magnetic head, a driving motor for driving the head carriage toward the radial direction of the magnetic disk, a track sensor for optically detecting a reference track on the magnetic disk, the apparatus comprises: a light shielding flag which is protruding at a side surface of the head carriage and having an oblique portion against the moving direction of the head carriage.

A magnetic disk apparatus may further comprise a track sensor which is adjustable toward perpendicular against the moving direction of the head carriage for receiving light through the light shielding flag.

Preferably a base board for mounting of the track sensor may be fixed on one side of a L-shaped bracket, another side of the L-shaped bracket may be adjustably connected to a frame along a long guide hole and fixed on the frame by the screw after adjusting is finished.

According to a third aspect of the present invention, a magnetic disk apparatus comprises: a first arm having a first head; a second arm having a second head which is facing against the first head; a carriage base, on which the first head and the second head are mounted, rotatably moves between a mounting position where the first and second head read and write data from/to a disk and an avoiding position where the disk is inserted or pulled out; a first arm pushing means and a second arm pushing means for applying a force to the first arm and the second arm toward the mounting position; a first avoiding arm for rotating the first arm as needed; a second avoiding arm for rotating the second arm as needed; and an avoiding lever for rotating the first avoiding arm and the second avoiding arm as needed.

A magnetic disk apparatus may further comprise a damper means which is connected with the avoiding lever.

Preferably the avoiding lever may contact at one end with a slide board which moves with a disk ejecting button when the disk is ejected. Another end of the avoiding lever may have a wedge shape oblique portion which drives the first avoiding arm and the second avoiding arm as needed, one end of the avoiding lever may contact with the sliding board by the pressure means.

Preferably the avoiding lever comprises: a disk holder contact portion which contacts a surface toward the insertion position of the disk holder; a second avoiding contact portion which contacts to the second avoiding arm; a first avoiding arm contact portion which surrounds a tip portion of the first avoiding arm; and a pressure means for rotating the avoiding lever toward the desired direction.

Further, preferably the first arm comprises a first arm supporting point, having half circular arc shape, which contacts with a first arm supporting point receiving portion mounted at the carriage base when the first arm is in the mounting position, an outer circular portion of the first arm supporting point contacts with the first arm receiving point and the first arm pressure means is arranged in an inner side of the first arm supporting point.

Further, preferably the carriage base comprises a plurality of convex portions for receiving the second arm, the second arm pressure means may be fixed to the carriage base together with one end of the second arm, and the second arm may contact the convex portion due to pressure.

According to a fourth aspect of the present invention, a magnetic disk apparatus comprises: a first arm having a first head; a second arm having a second head which is facing against the first head; a carriage base, on which the first head and the second head are fixed by the screw, rotatably moves between a mounting position where the first and second head read and write data from/to a disk and an avoiding position where the disk is inserted or pulled out, the carriage base has a plurality of convex portions for receiving the second arm, the first arm is arranged toward the insertion movement direction of the disk holder, the second arm is adjustably fixed on the carriage base by the screw together with the second arm pressure means for contacting with the convex portion.

Preferably the second arm comprises an adjusting notch portion provided at a side of the second arm or an adjusting hole.

DETAILED DESCRIPTION OF THE PREFERRED EMBODIMENTS

First embodiment

Figure 1:
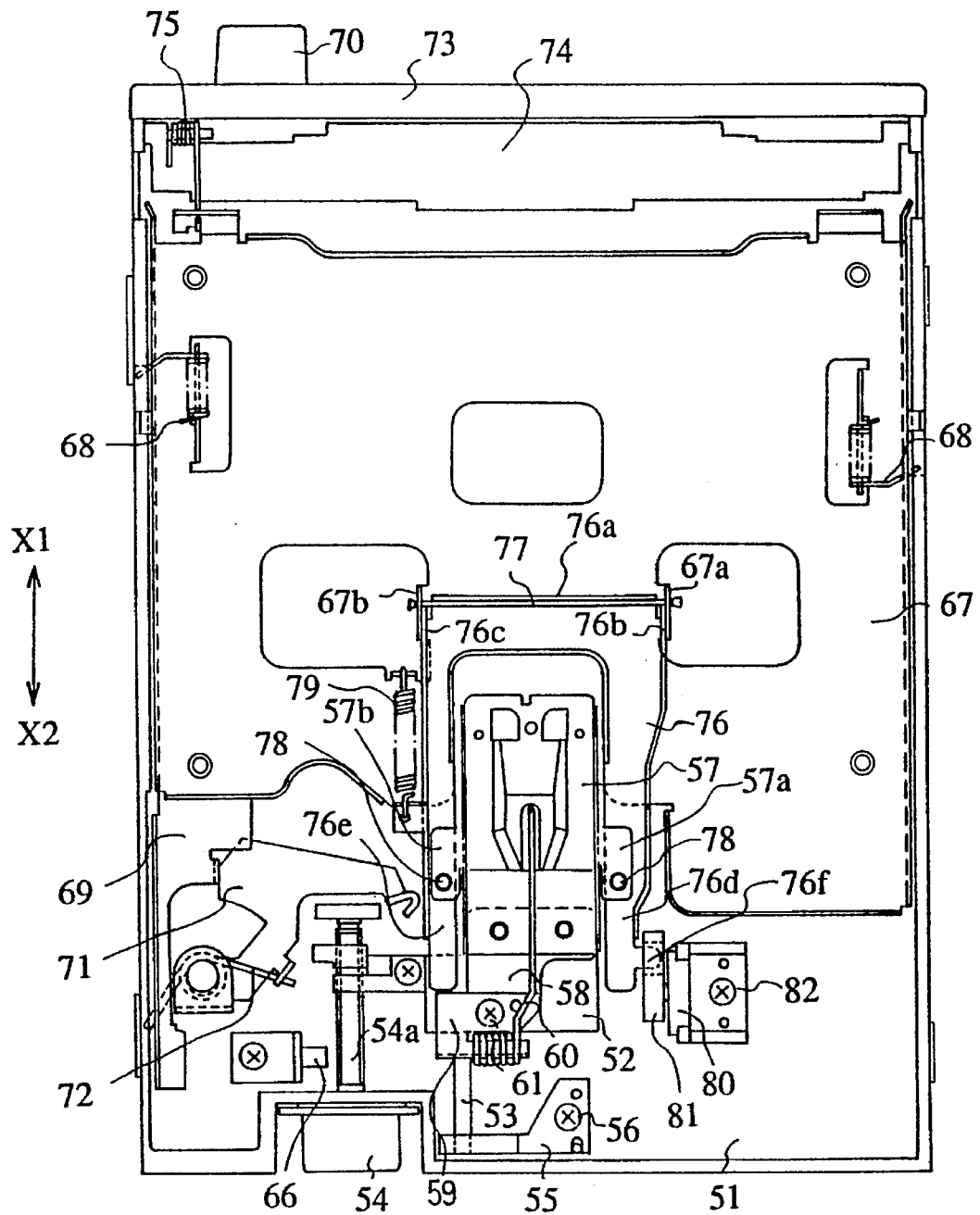
FIG. 1 is a plan view of a magnetic disk apparatus of an embodiment of the present invention.
Figure 2:
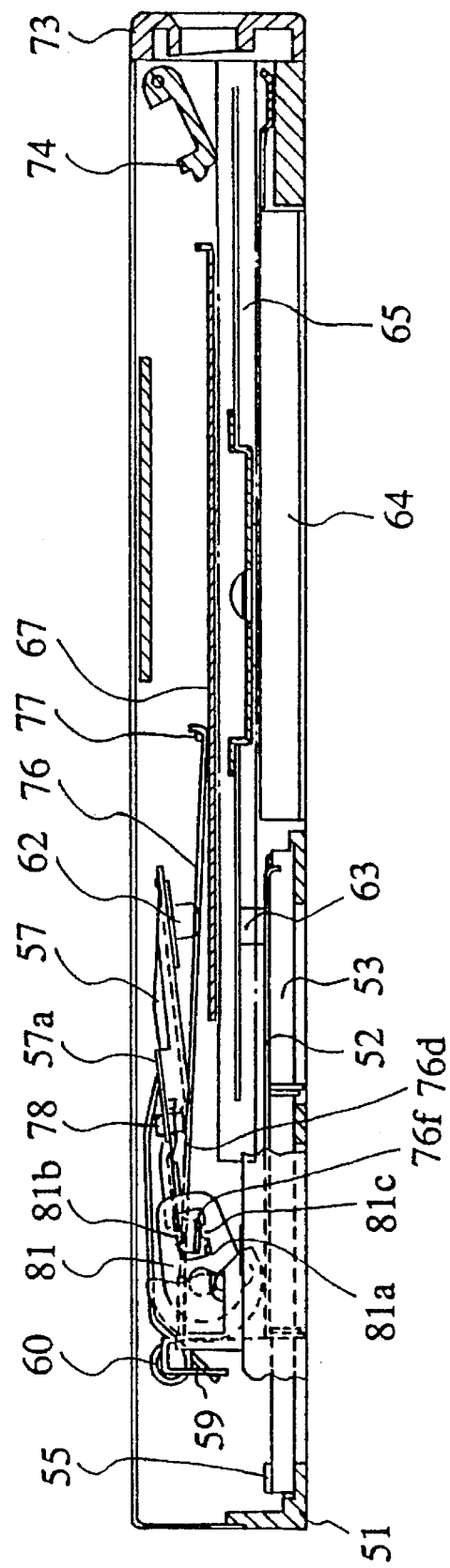
FIG. 2 is a sectional view of a magnetic disk apparatus immediately after a disk is inserted into the FDD.
Figure 3:
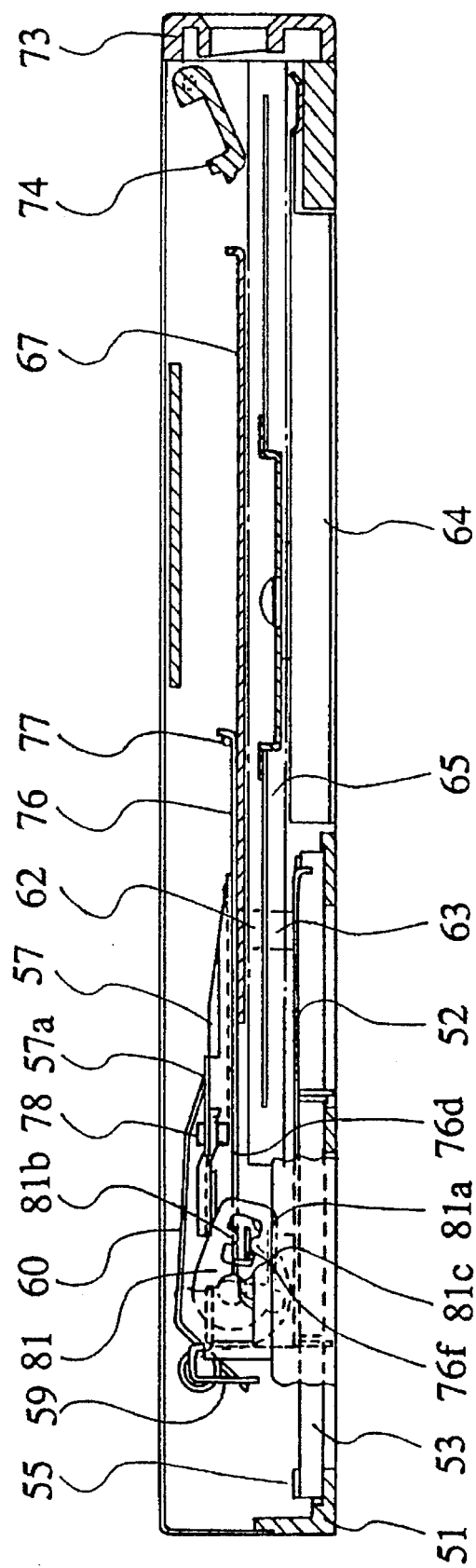
FIG. 3 is a sectional view of a magnetic disk apparatus after a disk is mounted into the FDD.

FIG. 1 is a plan view of a magnetic disk apparatus having a head elevation apparatus. FIG. 2 is a sectional view of the magnetic disk apparatus immediately after the disk is inserted into the FDD. FIG. 3 is a sectional view of the magnetic disk apparatus after the disk is mounted into the FDD.

In the figures, 51 is a frame, 52 is a head carriage which is supported by a guide rod 53 and a needle screw 54a of a stepping motor 54 so as to move in the X1, X2 direction. 55 is a rod pressure spring which is fixed by the screw 56 for fixing the guide rod 53 to the frame 51. 57 is a head arm which is fixed to the head carriage 52 by the screw 61 via the head pressure spring fixed platform 59 which supports the head presser spring 60. The head arm 57 is able to rotate by an arm supporting blade spring 58. 62 is an upper head mounted on the head arm 57. 63 is a lower head mounted on the head carriage 52 against the upper head 62. The stepping motor 54 moves the head carriage 52 and the head arm 57 in the X1, X2 direction. A head pressure spring 60 presses the upper head 62 so as to give contact pressure to the disk 65 which is driven by the spindle motor 64 mounted on the frame 51. In the figures, the disk cartridge for housing the disk 65 is shown by the chain line.

66 is a TK sensor for detecting the reference point (which defines the track 00 of the disk 65) of the head carriage 52. 67 is a disk holder for positioning the disk 65. The disk holder 67 is inserted into or removed from the FDD by using the disk insertion point and the disk mounting point supported by the frame 51. 68 are disk holder pressure springs, one end of the disk holder is supported by the frame 51, to give pressure to the disk holder 67. 69 is a slide board arranged between the frame 51 and the disk holder 67. The slide board 69 has a disk ejection button at the front surface and moves in the X1, X2 direction. The disk holder 67 moves between the disk inserting position and the disk mounting position by causing the slide board 69 to move in the X1, X2 direction. The slide board 69 is pulled in the X1 direction by a spring not shown in the figure. 71 is a lever for holding the slide board 69 to a desired position when the disk holder 67 is at the disk inserting position. 72 is a lever spring for pulling the lever 71 toward a predetermined direction. When the slide board 69 is moved in the X1 direction, the disk holder 67 remains at the disk mounting position. When the slide board 69 is moved in the X2 direction, the disk holder 67 remains at the disk inserting position and the slide board 69 engage to the lever 71. 73 is a front panel fixed to the frame 51. 74 is a door mounted to the front panel 73. The door 74 rotates when the disk holder is inserted. 75 is a door spring for pulling the door 74 toward a predetermined direction.

76 is a U-shaped arm load board, its bottom portion is supported at the disk holder 67 by the arm load axis 77. The arm load board 76 is able to turn on the arm load axis 77. The turning direction of the arm load board 76 is the same as that of the head arm 57. The arm load axis 77 is positioned and held at the bearing portions 67a, 67b located at the disk holder 67. The positioning of the arm load board 76 toward the X1,X2 direction is carried out by putting the arm load board 76 between the bottom wall 76a and the side walls 76b, 76c. The positioning of the arm load board 76 perpendicular to the X1,X2 direction is carded out by putting the side walls 76b, 76c between the bearing portions 67a, 67b. The arm load axis 77 is pulled toward the disk mounting side in order that the bottom portion supported by the arm load axis 77 of the arm load board 76 may not be lifted over the upper surface of the disk holder 67. Each 76d, 76e is a head arm receiving portion arranged at both sides of the arm load board 76. The arm load board 76 receives head arm adjusting screws 78 located at the blade portions 57a, 57b arranged at both sides of the head arm 57.

When the disk holder 67 is at the disk inserting position, the head arm receiving portions 76d, 76e push the head arm adjusting screws 78 upward which also push the head arm 57 upward so that the upper head 62 may not contact the disk 65 and the disk cartridge. When the disk holder 67 is at the disk mounting position, the head arm receiving portions 76d, 76e are located at the lower position so that they may not contact the head arm adjusting screw 78.

79 is an arm load board pressure spring which pulls the arm load board 76 toward the disk mounting position and avoids the loosening between the arm load board 76 and the arm load axis 77. 80 is an oil damper fixed on the frame 51 by the screw 82 and having an arm 81. The arm 81 has an arm load board receiving portion 81a. The arm load board receiving portion 81a has semicircular protruding portions 81b, 81c which hold the damper supporting portion 76f arranged at one end of the arm load board 76. The damper supporting portion 76f is arranged such that it contacts the protruding portions 81b and 81c when the arm load board 76 turns. The arm load board 76 and the oil damper 80 help the arm 81 turn on the arm load axis 77 of the arm load board. That is, the oil damper 80 gives reaction force against the rotation of the arm load board 76 so that the arm load 76 will turn slowly. The arm load pressure spring 79 turns the arm load board 76 by its spring force so that the arm load board 76 will contact closely with the disk holder 67.

The operation of the embodiment is explained here. While the disk holder 67 is located at the disk inserting position and the head arm 57 is lifted to the upper position, when the disk 65 is inserted into the disk holder 67, a shutter (not shown) is opened by the lever 71 until the position shown in FIG. 1. When the lever 71 moves until the position shown in FIG. 1, the engagement between the slide board 69 and the lever 71 is released. Then the slide board 69 moves toward the X1 direction, the disk holder 67 moves instantly to the disk mounting position shown in FIG. 2 by the spring force of the disk holder pressure spring 68, and then the disk 65 is mounted on the spindle motor 64. Since the damper supporting portion 76f of the arm load board 76 receives the reaction force from the oil damper 80, the damper supporting portion 76f does not fall down. But the bottom wall 76a which is supported by the disk holder 67 falls down, therefore the arm load board 76 inclines as shown in FIG. 2. Since the arm load board 76 inclines, the head arm 57 is also at inclined state and the upper head 62 is at the upper position without landing on the disk 65. The arm load board 76 turns slowly toward the disk mounting position side. The head arm 57 also turns slowly in response to the rotation of the arm load board 76 and finally the head arm 57 contacts the disk holder 67 as shown in FIG. 3. At this time, the head arm receiving portions 76d, 76e of the arm load board 76 do not contact with the head arm adjusting screw 78, and the upper head 62 contacts with the disk 65 by the spring force of the head pressure spring 60 at an appropriate pressure. Therefore the upper head 62 can read from and write to the disk 65.

Since the inclination angle of the arm load board 76 is decided by the moving distance between the disk insertion position and the disk mounting position of the disk holder 67, the inclination angle is constant and also the head landing time Td is constant in spite of the head arm position in the arrow X1, X2 direction. The head arm landing time Td can be set arbitrary by adjusting the rotation torque of the oil damper 80 and the spring constant of the arm load pressure spring 79.

Since the head arm adjusting screws 78, which are arranged at both sides of the blade portions 57a, 57b of the head arm 57, are supported by the head arm receiving portions 76d, 76e of the arm load board 76, the attitude of the head arm 57 can be maintained stable when the head arm 57 moves down to the lower position side or moves up to the upper position side. Also since an unnecessary force other than the force for rotating the head arm 57 are not applied, the stable landing time Td is obtained.

Second embodiment

Figure 4:
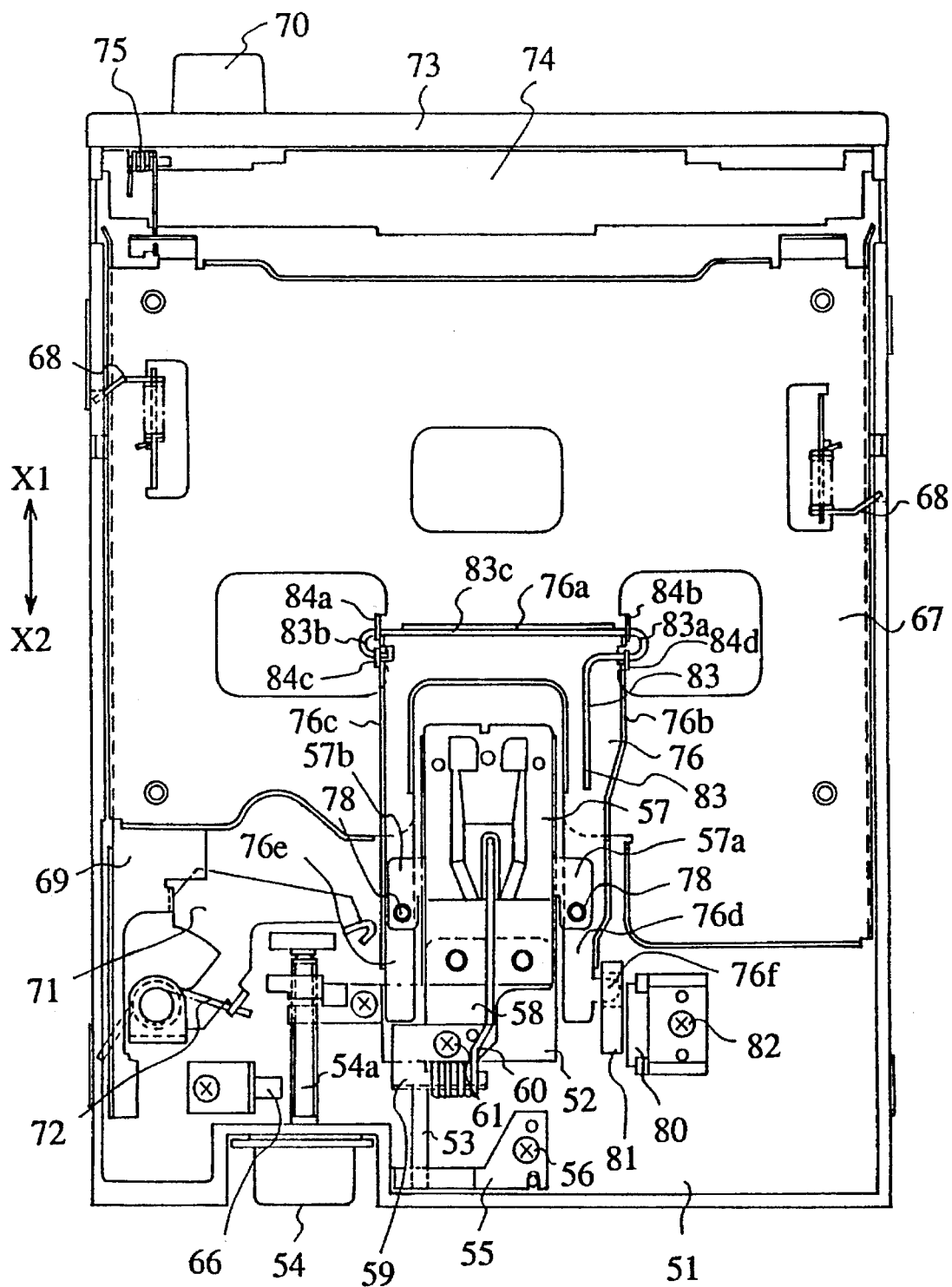
FIG. 4 is a plan view of a magnetic disk apparatus of another embodiment of the present invention.
Figure 5:
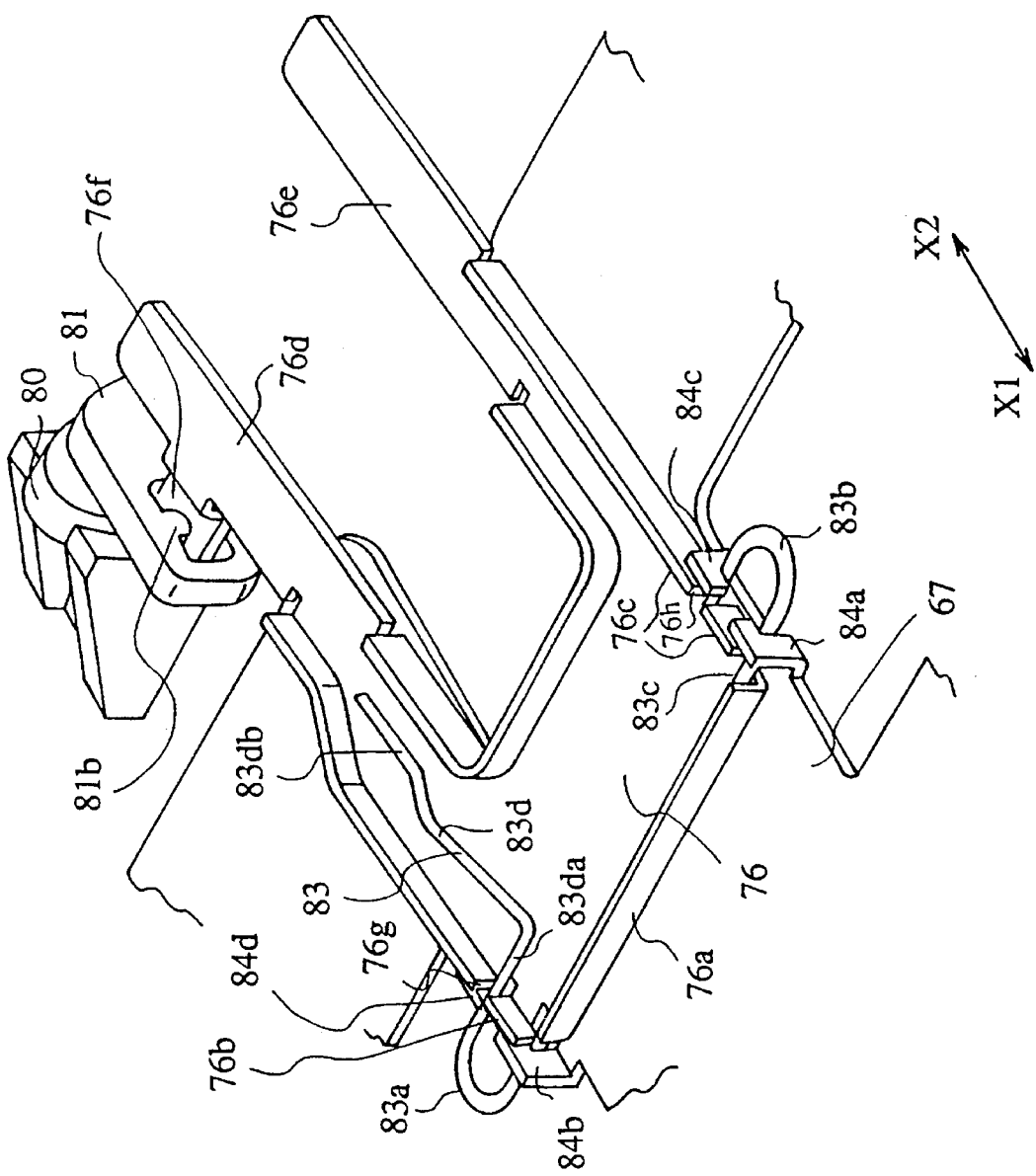
FIG. 5 is a principal perspective view of a magnetic disk apparatus of a second embodiment of the present invention.
Figure 6:
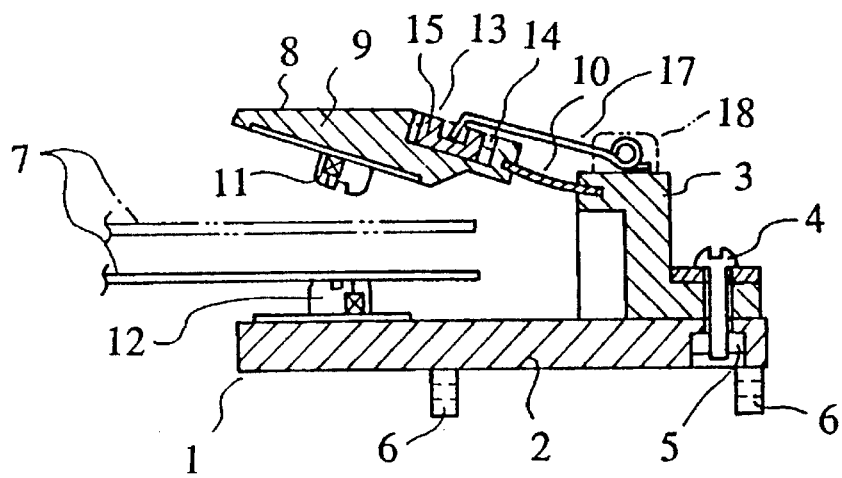
FIG. 6 a sectional view of a conventional magnetic disk apparatus where the head arm is upper position.
Figure 7:
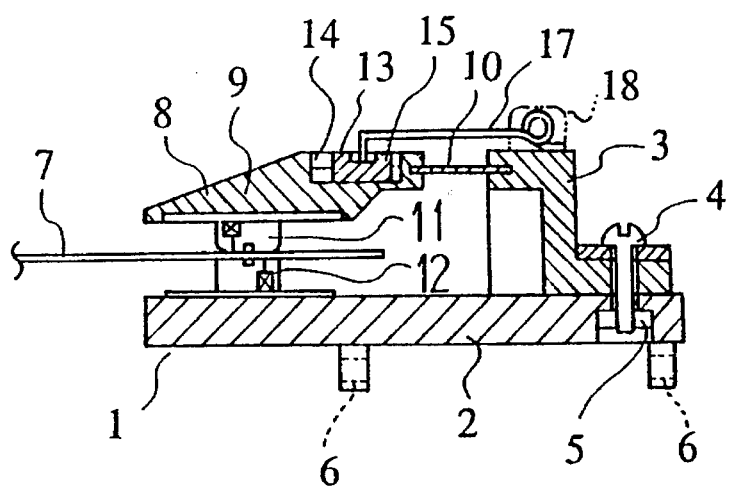
FIG. 7 is a sectional view of a conventional magnetic disk apparatus where the head arm is lower position.
Figure 8:
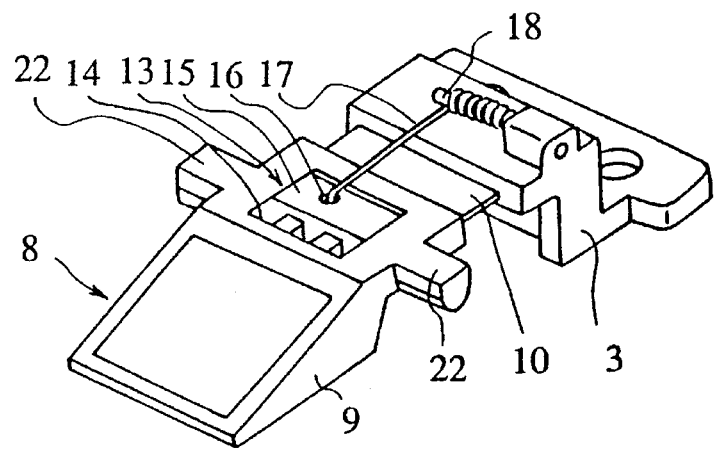
FIG. 8 is a perspective view of a damper construction of the conventional head elevation apparatus.
Figure 9:
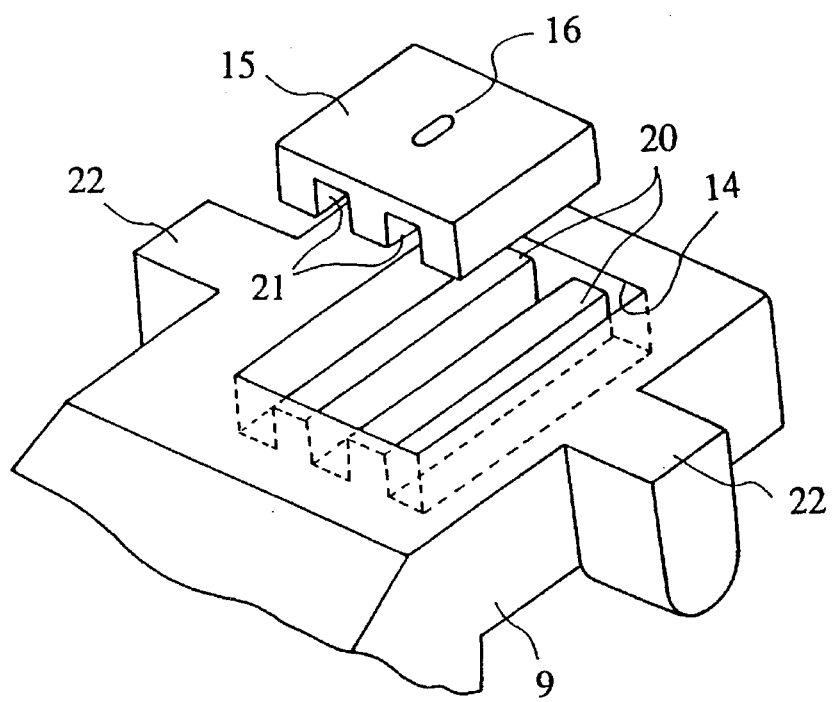
FIG. 9 is a principal perspective view of a damper construction of the conventional head elevation apparatus.

In the embodiment described above, in order to support the arm load board 76 on the disk holder 67 for it to turn on its axis and to pull the arm load board 76 toward the disk mounting position side, it is necessary to supply the arm load axis 77 and the arm load board pressure spring 79. But, as shown in FIG. 4 and 5, an arm load spring 83 having functions as the axis and the spring simplifies the construction of FDD.

In FIG. 5, 84a, 84b, 84c and 84d are L-shaped blocks arranged at the disk holder 67 and holding U-shaped curvature portions 83a, 83b of the arm load spring 83. The arm load spring 83 is arranged in the disk holder 67 without loosening by the force of the curvature portions 83a, 83b. The arm load board 76 is supported by the axis portion 83c of the arm load spring 83. The position of the arm load board 76 in the X1, X2 direction is carried out by inserting the axis portion 83c into the bottom wall 76a and the side walls 76b, 76c of the arm load board 76. At the side walls 76b and 76c, clearance grooves 76g, 76h are arranged so that the returning portion 83da and the curvature portion 83b of the spring portion 83d of the arm load spring 83 do not contact the arm load board 76. The position of the arm load board 76 perpendicular to the X1, X2 direction is carried out by inserting the side walls 76b, 76c into the hook portions 84a, 84b.

The bottom portion supported by the axis portion 83c of the arm load spring 83 of the arm load board 76 is pulled toward the disk mounting portion side by the axis portion 83c such that it does not lift over the upper surface of the disk holder 67. The tip portion 83db of the of spring portion 83d contacts the arm load board 76 by the desired spring force and presses the arm load board 76 toward the disk mounting portion side. Since the arm load spring 83 is supported by the disk holder 67 at four points, it is able to give pressure to the arm load board 76.

As described above, while the disk holder 67 is located at the disk inserting position, when the disk 65 is inserted into the disk holder 67, the disk holder 67 moves instantly to the disk mounting position. According to the above movement, the side supported by the axis portion 83c of the arm load spring 83 of the arm load board 76 falls down together with the disk holder 67. But, since the damper supporting portion 76f receives reaction force by the oil damper 80, the side supported by the axis portion 83c does not move together with the disk holder 76. Therefore the arm load board 76 inclines toward one side. Then the arm load board 76 slowly turns toward the disk mounting sides by the spring force of the spring portion 83d of the arm load spring 83. In response to the movement of the arm load board 76, the head arm 57 turns slowly toward the lower position side. Then the arm load board 76 contacts closely the disk holder 67. At this time, the head arm receiving portions 76d, 76e of the arm load board 76 do not contact the head arm adjusting screw 78 and the upper head contacts the disk 65 by the spring force of the head pressure spring 60 at a desirable pressure. Therefore the heads are at the state of being able to read and write.

As described above, the second embodiment can obtain the same effect by using the arm load spring 83 having the function as an axis and a spring. This second embodiment can simplify the apparatus and also lessen the space of the soft landing mechanism.

Third Embodiment

Figure 17:
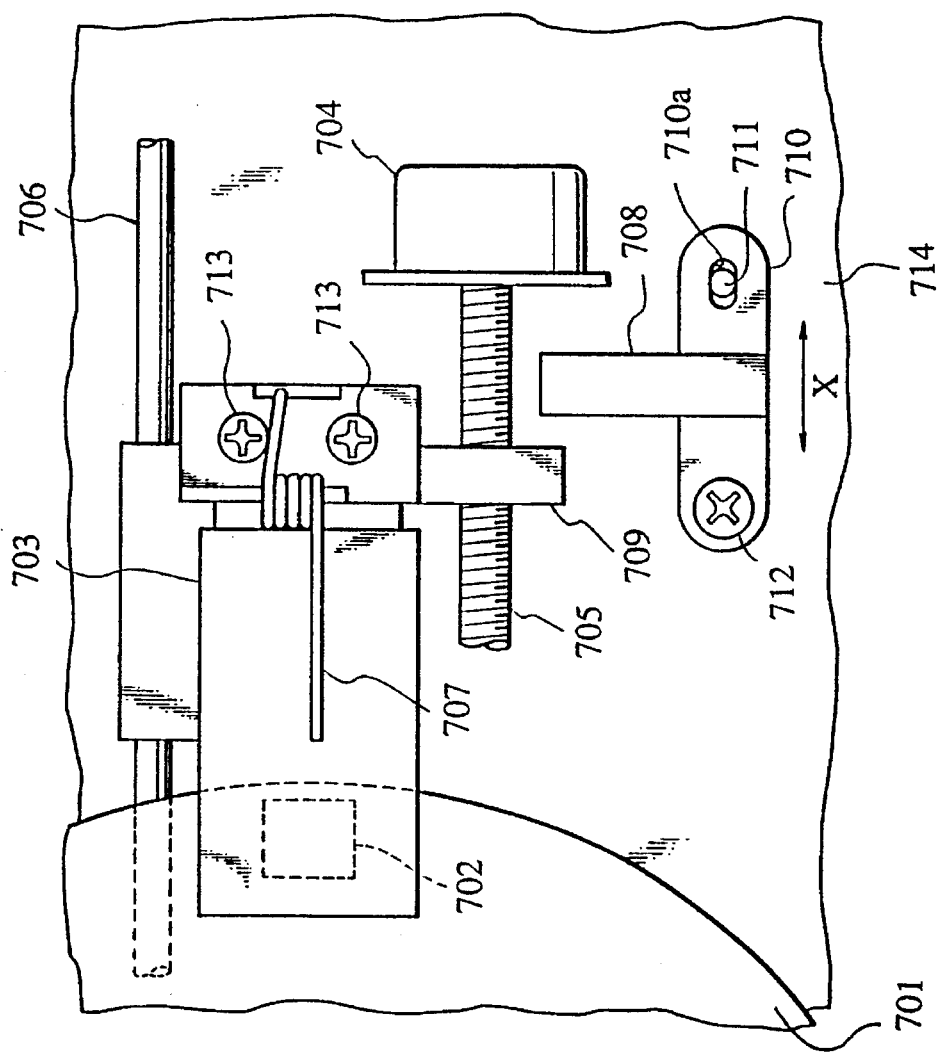
FIG. 17 is a plan view of the track 00 position detecting mechanism in the magnetic apparatus disclosed in the prior art.
Figure 18:
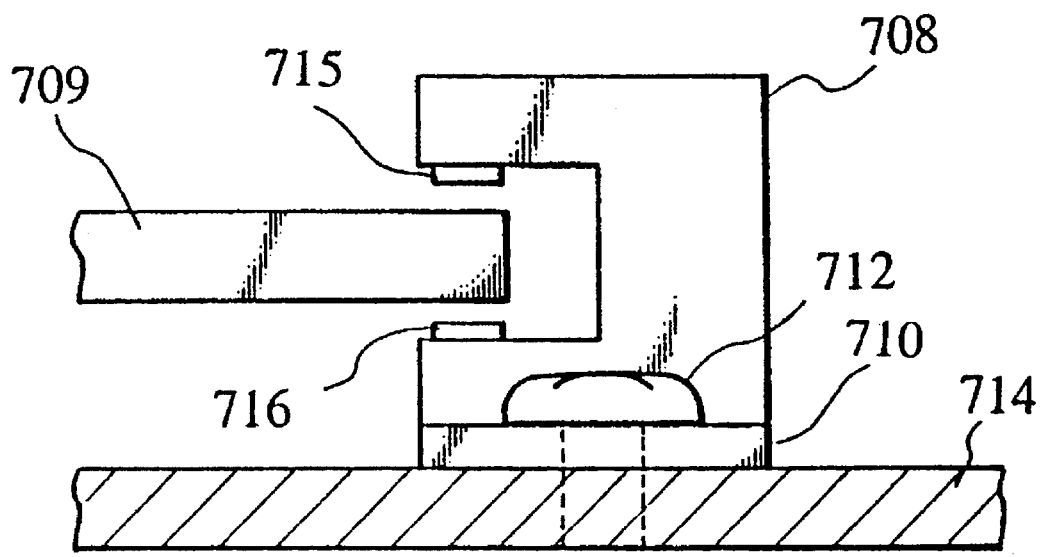
FIG. 18 is a side view showing a positional relation between the track sensor for detecting position of the track 00 and the light shielding flag.

A third embodiment of the present invention is explained using FIG. 10 to FIG. 16. Since the same numerals as those in FIG. 17 and 18 refer to the same elements or the same portions, the detailed explanation is omitted.

Figure 10:
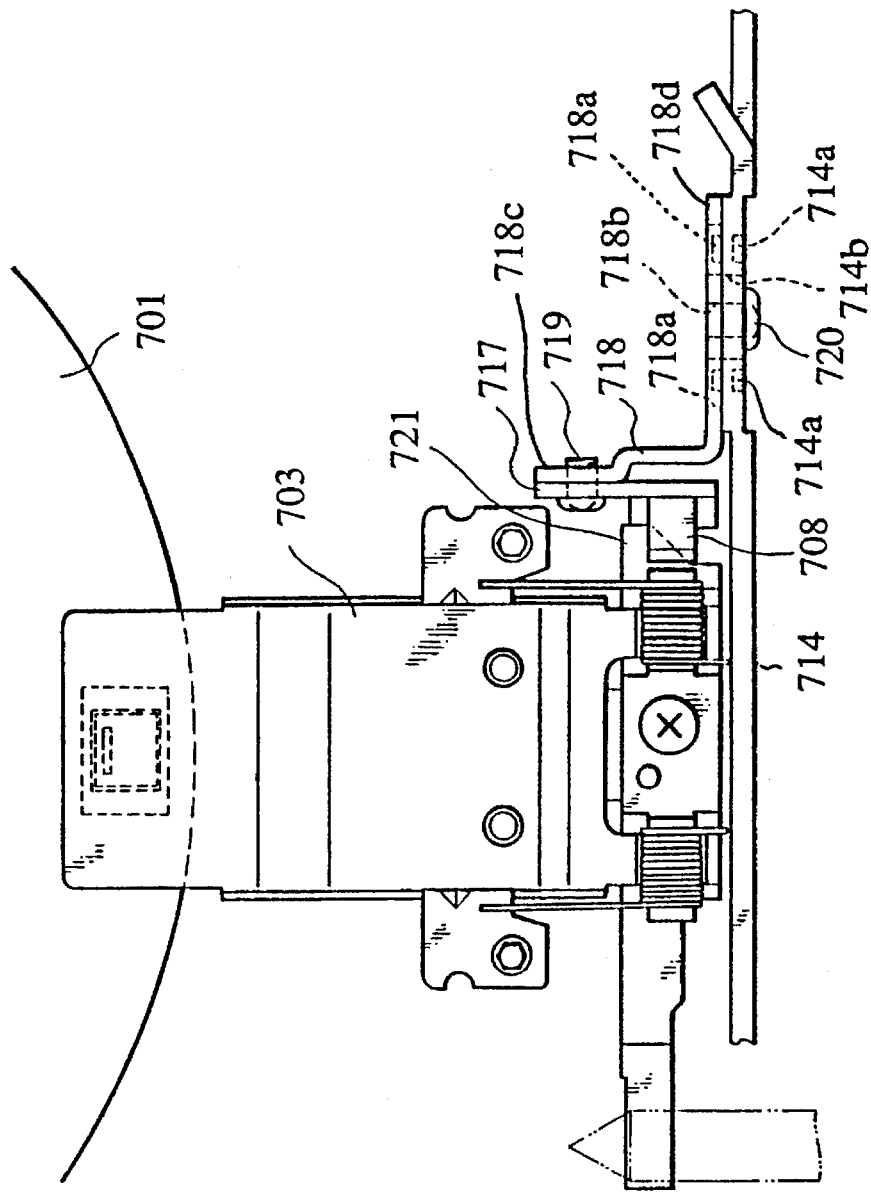
FIG. 10 is a plan view of a light shielding flag protruding from the side of the head carriage.

In FIG. 10, 714 is a frame oriented perpendicular to the moving direction of the head carriage. 714a is a projecting portion projected from the frame 714. 714b is a long guide groove for positioning which is perforated horizontally against the frame 714. 717 is a FPC reinforced board which mounts an optical track sensor 708 and FPC (not shown in the figure). 718 is a L-shaped bracket which attaches the FPC reinforced board 717 on it and is movable in the perpendicular direction against the movement of the head carriage 703. 718a are long grooves for positioning which are perforated horizontally against the L-shaped bracket 718 at two places of it. 718b is a screw hole perforated in the L-shaped bracket 718. 719 is a mounting screw for mounting the FPC reinforced board 717 to the one end 718c of the L-shaped bracket 718. 720 is a fixing screw which is screwed from outside of the frame 714 for mounting the other end 718d of the L-shaped bracket 718 to the frame 7 14 after adjusting the reference track position. 721 is a light shielding flag protruding from the side of the head carriage 703.

Figure 11:
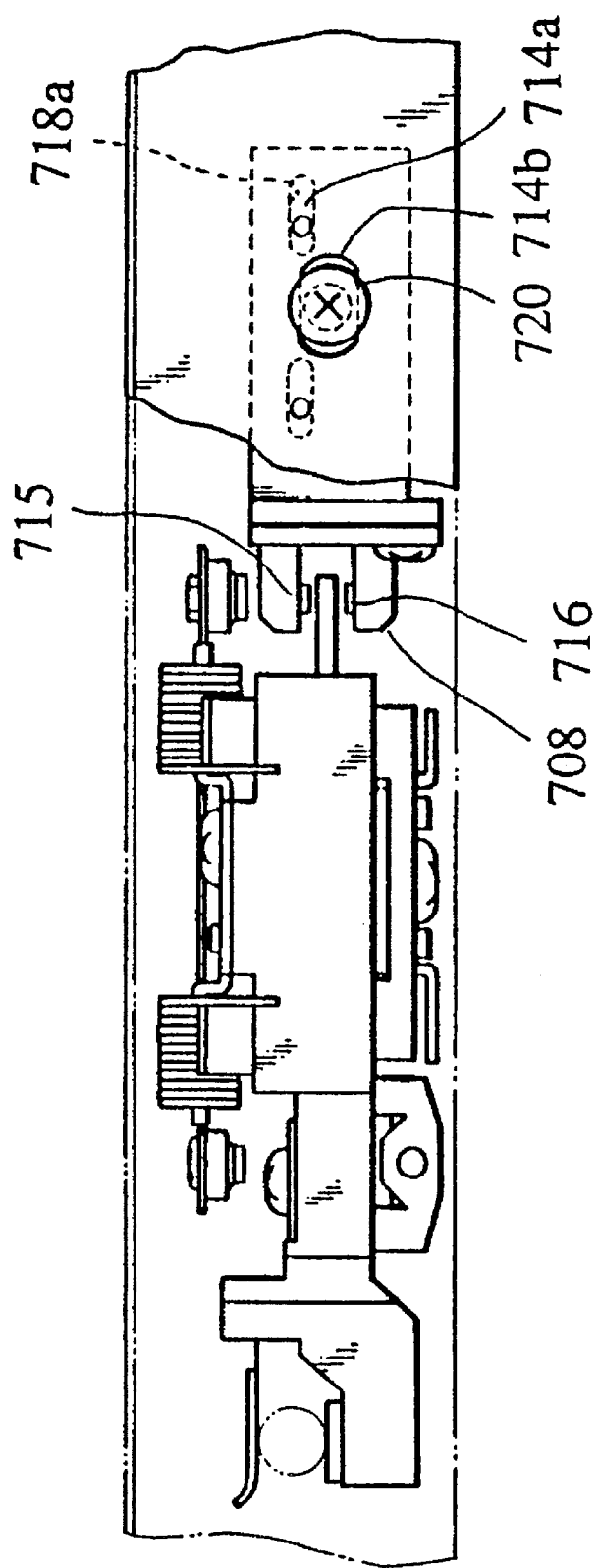
FIG. 11 is a side view showing a positional relation between a light shielding flag, a light emitting element and a light receiving element.

The operation of the third embodiment is explained here. As shown in FIG. 10 and FIG. 11, the light shielding flag 721 protrudes from the side of the head carriage 703 and has an oblique angle against the moving direction of the head carriage 703. The light emitting element 715 and the light receiving element 716 are mounted with U-shape on the FPC reinforced board 717. The light shielding flag 721 is inserted horizontally between the light emitting element and the light receiving element. The light shielding flag 721 detects a track position 00 in combination with the light emitting element 715 and the light receiving element 716.

Figure 12:
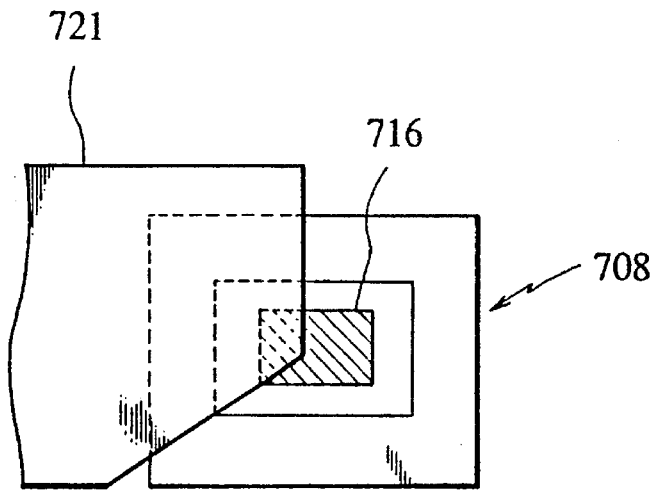
FIG. 12 shows a positional relation between the oblique shape shielding flag and the receiving element.
Figure 13:
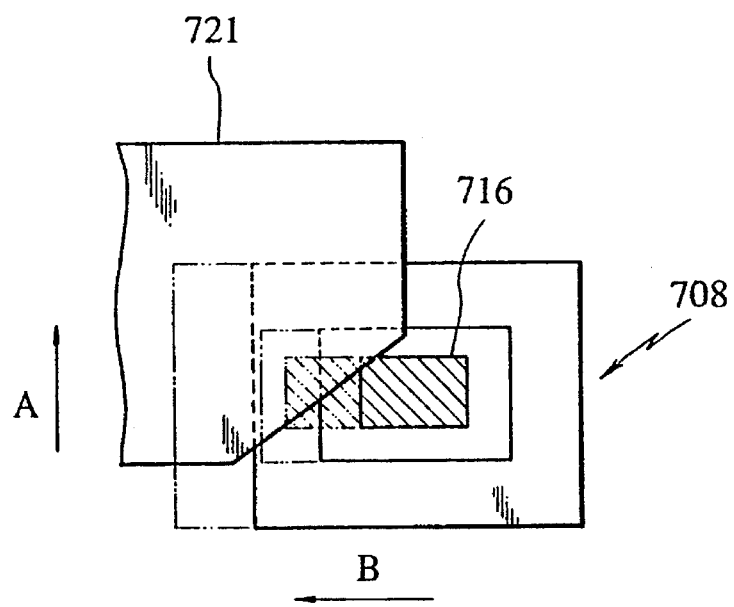
FIG. 13 shows the oblique light shielding flag which is shifted toward A direction.

FIG. 12 and FIG. 13 show a positional relation between the oblique shape shielding flag 721 and the receiving element 716 of the optical track sensor 708. More particularly, FIG. 12 shows a positional relation between the oblique shape shielding flag 721 and the receiving element 716 in case the magnetic head 702 located on the track 00 moves together with the head carriage 703.

In FIG. 13, the solid line shows that the oblique light shielding flag 721 is shifted in the A direction, which is the same direction as the moving direction of the head carriage, by influence of the parts error or the assembling error of the head carriage compared with the state shown in FIG. 12. The chain line shows that the receiving element 716 detects the track 00 by shifting optical sensor 708 in the B direction which is perpendicular to the moving direction of the head carriage 703 from the position of the solid line.

As shown in FIG. 13, if the oblique flag 721 is shifted from the optical sensor 708, the receiving light quantity at the receiving element 716 varies in response to the shifted distance. Therefore the light quantity necessary for detecting the track 00 position cannot be obtained and the track 00 cannot be detected correctly. By shifting the light receiving element 716 toward B direction as shown in FIG. 13, the receiving light quantity can be adjusted to be equal to that shown in FIG. 12. Therefore the output voltage in case of FIG. 13 can be equal to that in FIG. 12. Since the optical track sensor 708 is set to detect the track 00 by a predetermined output voltage, the magnetic head of the present invention can detect the correct track 00 position by adjusting the position of the receiving sensor 716. That is, by adjusting the position of the receiving element, the influence of the parts error and the assembling error of the head carriage 703 is avoided. Therefore the detection of the track 00 position of the magnetic head can be easily and correctly carried out.

The adjusting of the optical track sensor 708 is carried out as follows. First, the FPC reinforced board 7 17 which mounts the optical track sensor 708 is fixed on one end 718c of the L-shaped bracket 718 by the mounting screw 719. The projecting portion 714a projecting from the frame 714 is fitted into the long guide grooves 718a which are horizontally located at the other end 718d of the L-shaped bracket 718. The Optical track sensor 708 is adjusted by moving the other end 718d in the C direction. The screw 720 is then fastened into the screw hole 718b through the long guide groove 714b from the outside of the frame 714. By the above process, the other end 718d of the L-shaped bracket 718 is fastened to the frame 714 by the screw 720 and the adjustment is finished.

Fourth embodiment

Figure 14:
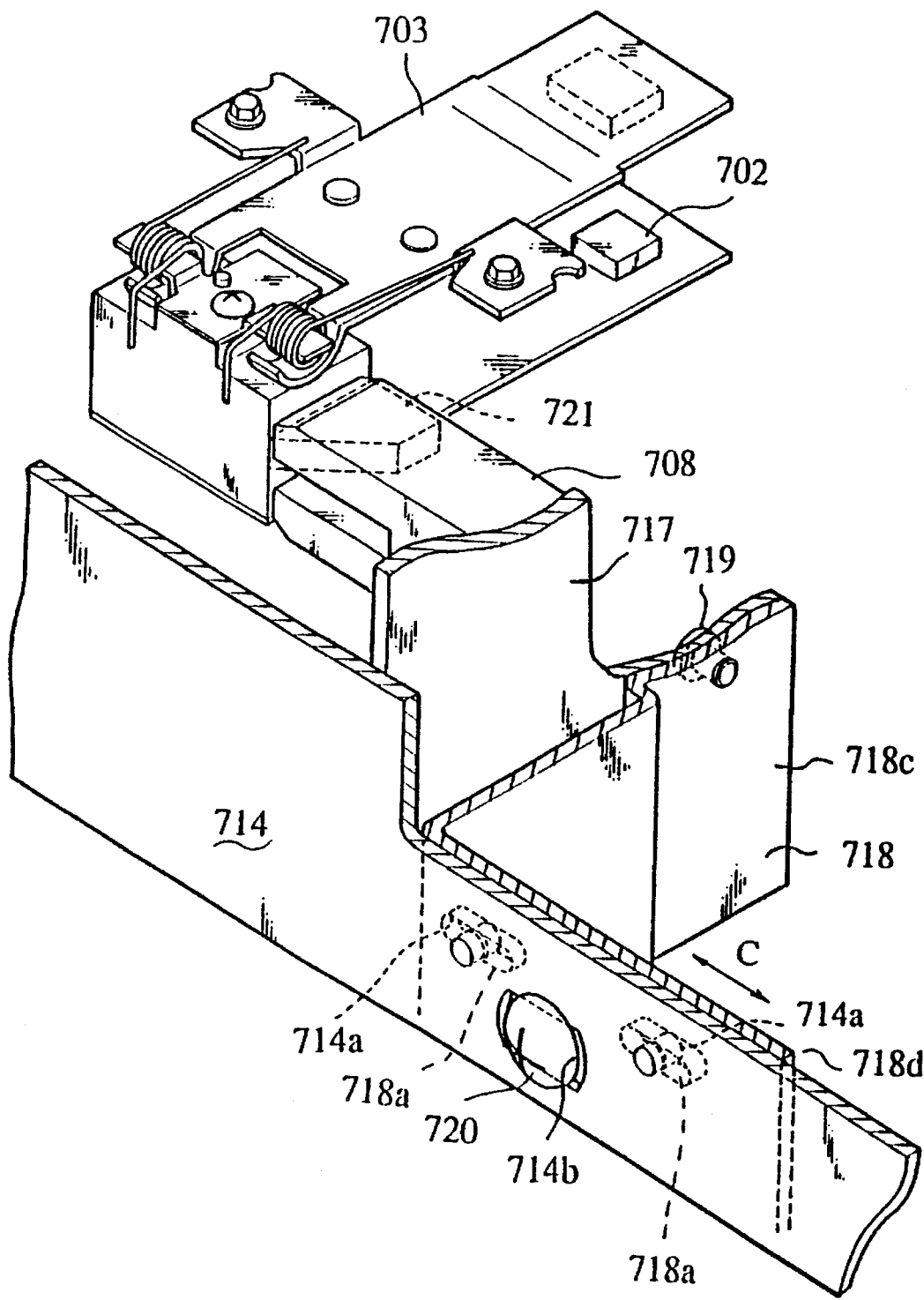
FIG. 14 shows a backward oblique shape light shielding flag.
Figure 15:
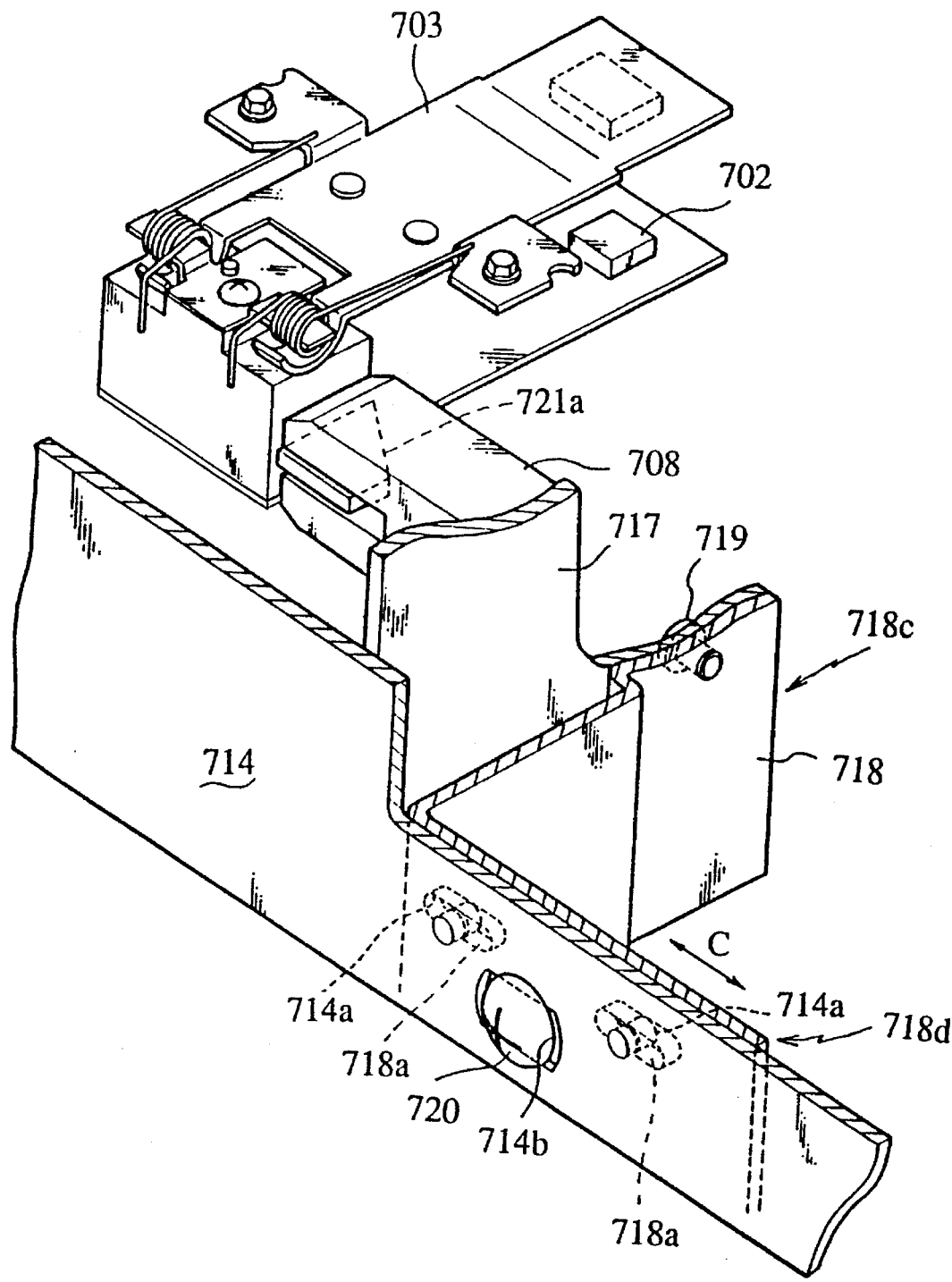
FIG. 15 shows a forward oblique shape light shielding flag.

In the third embodiment in FIG. 14, the shielding flag 721 has a backward oblique shape of the head carriage 703 which faces toward the outer track of the magnetic medium. In FIG. 15, the shielding flag 721a has a forward oblique shape of the head carriage 703 which faces toward the inner track of the magnetic medium. The effect of the fourth embodiment of the present invention has substantially the same effect as that of the third embodiment in FIG. 14.

Fifth embodiment

Figure 16:
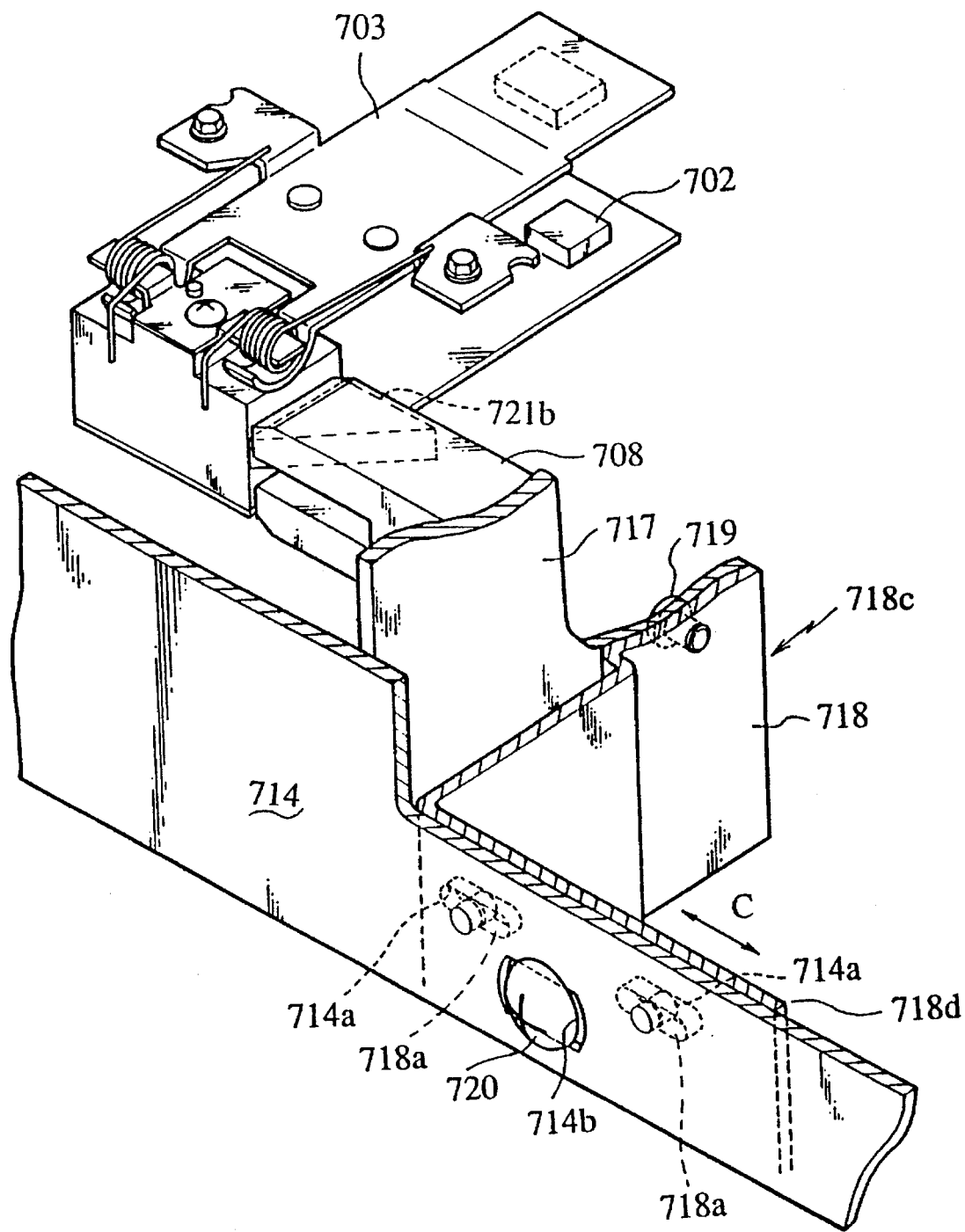
FIG. 16 shows a light shielding flag constructed of only oblique lines of another embodiment of the present invention.

In the above embodiments, each light shielding flag is constructed of a straight line and an oblique line. But it has the same effect if the light shielding flag is constructed of only an oblique portion. FIG. 16 shows such light shielding flag of a fifth embodiment of the present invention.

Sixth embodiment

In the above embodiments, the long guide groove 714b is perforated in the frame 714 and the long guide grooves 718a are provided in the L-shaped bracket 718. These long guide grooves may be provided in the L-shaped bracket 718 or the frame 714. But, in order to cause the L-shaped bracket to move horizontally with precision, it is preferable to provide a plurality of guide grooves.

Seventh embodiment

Figure 19:
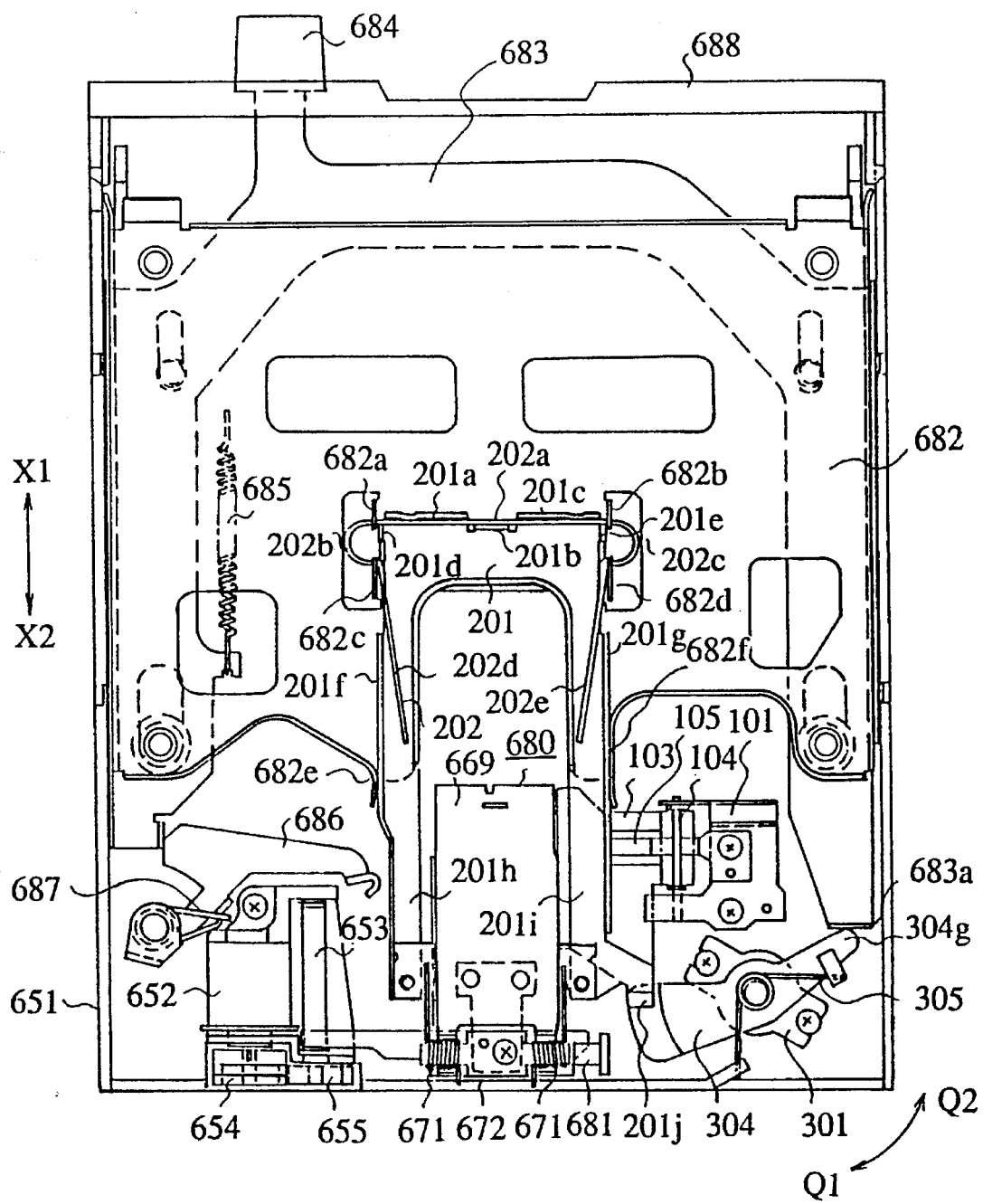
FIG. 19 is a plan view of FDD in which the diskette is loaded.
Figure 20:
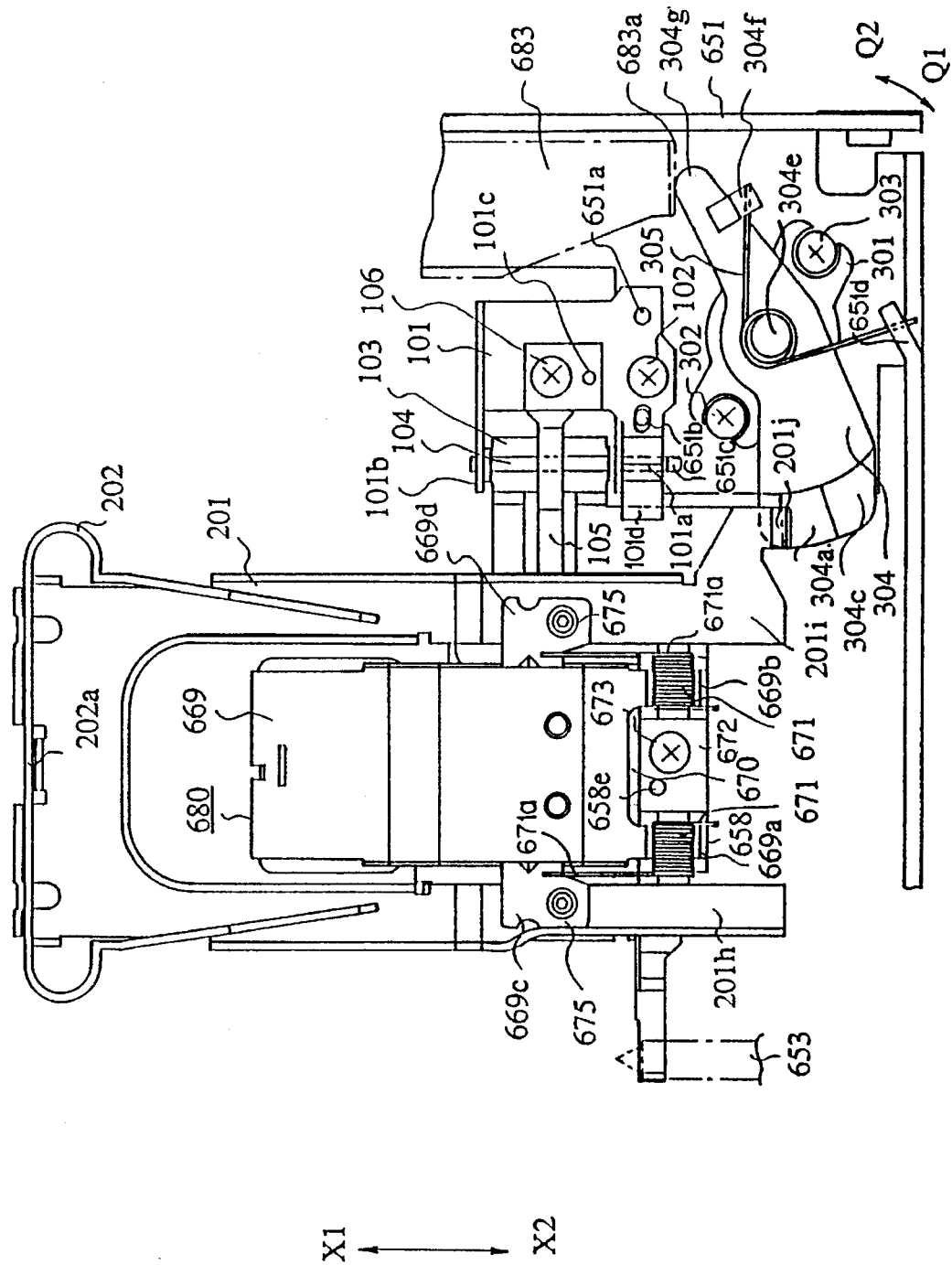
FIG. 20 is a plan view of principal parts of FDD in which the diskette is loaded.
Figure 21:
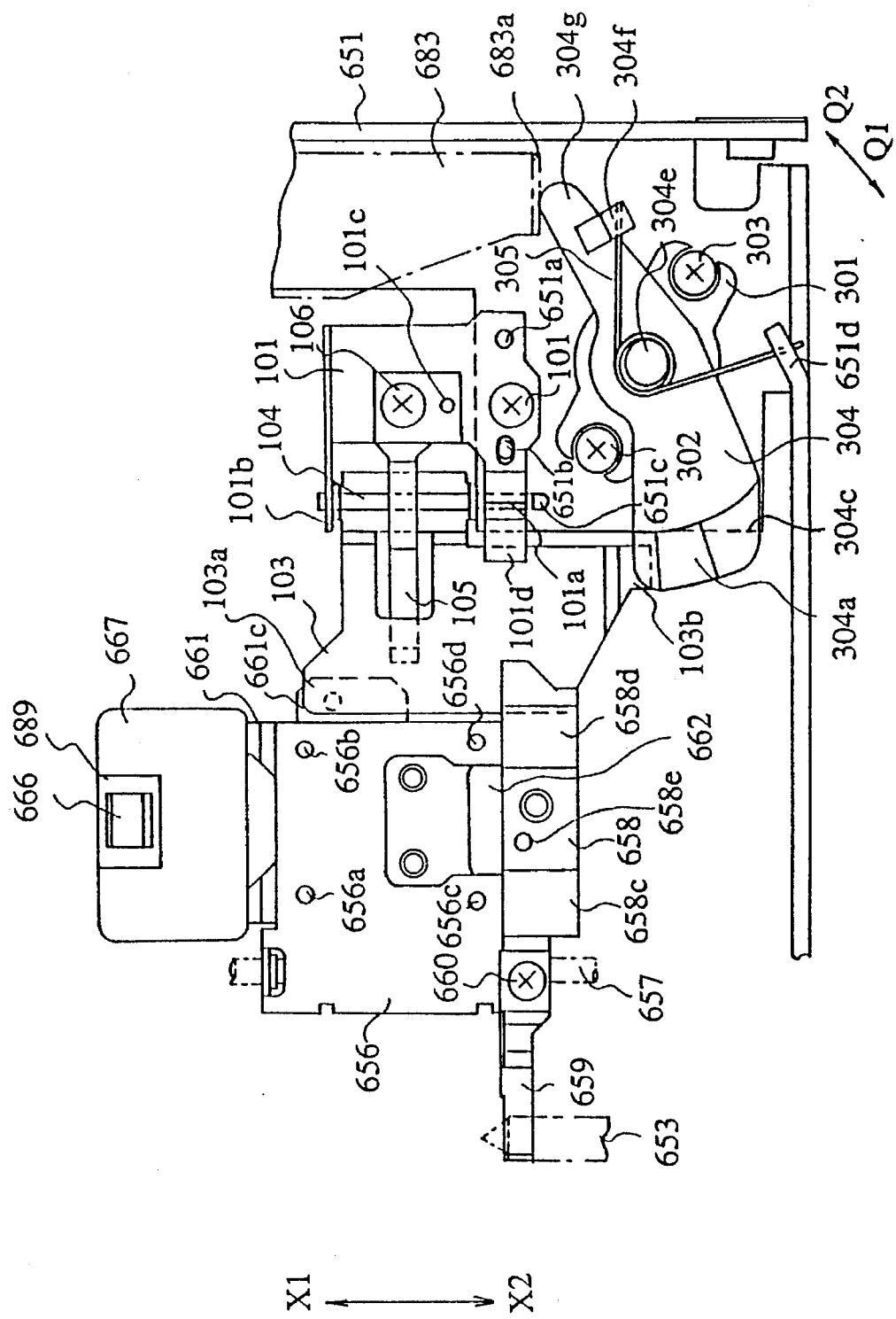
FIG. 21 is a plan view of principal parts of FDD where the S1 arm and S1 arm avoiding mechanism are eliminated from FIG. 20.
Figure 22:
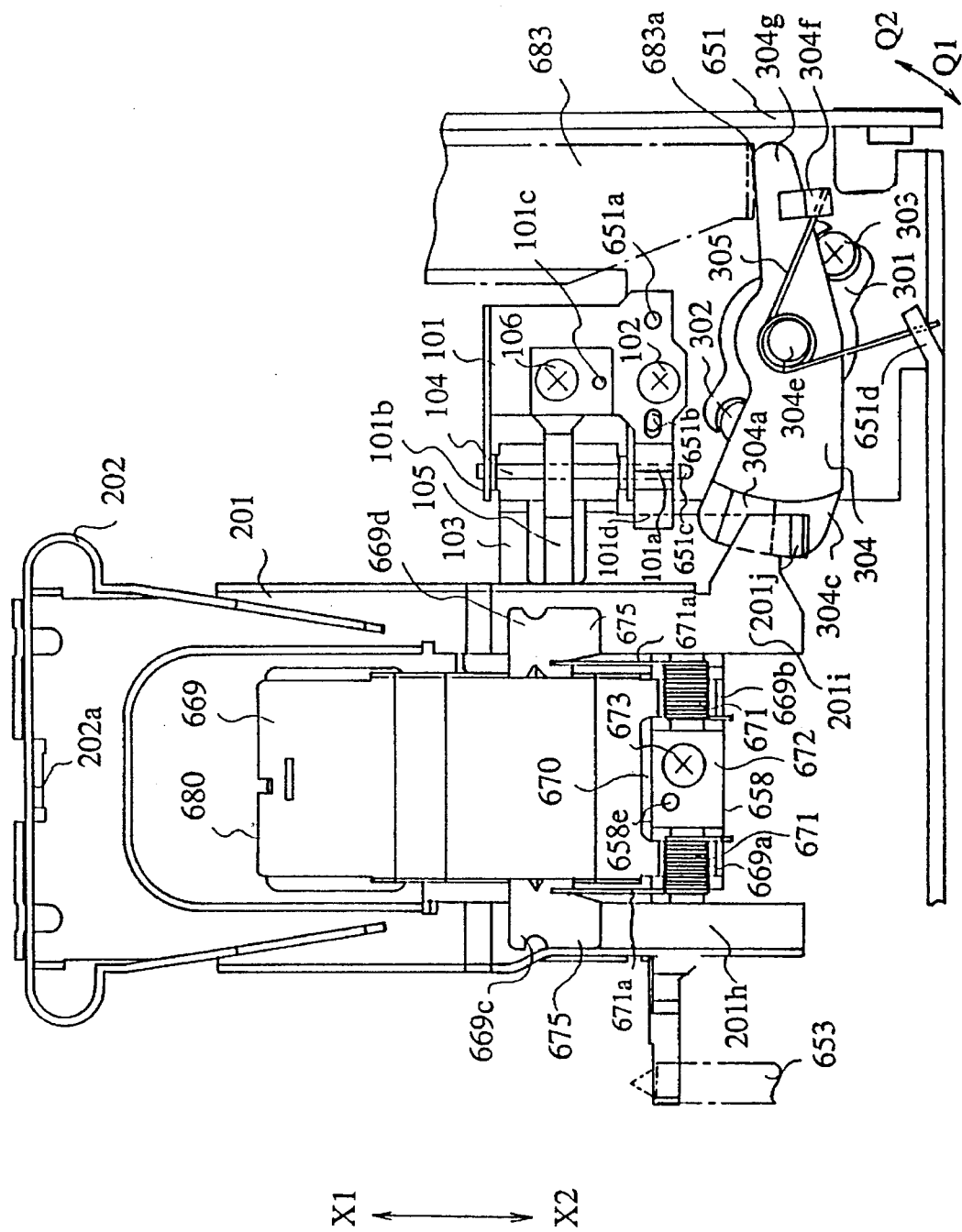
FIG. 22 is a plan view of FDD in which a diskette is unloaded.
Figure 23:
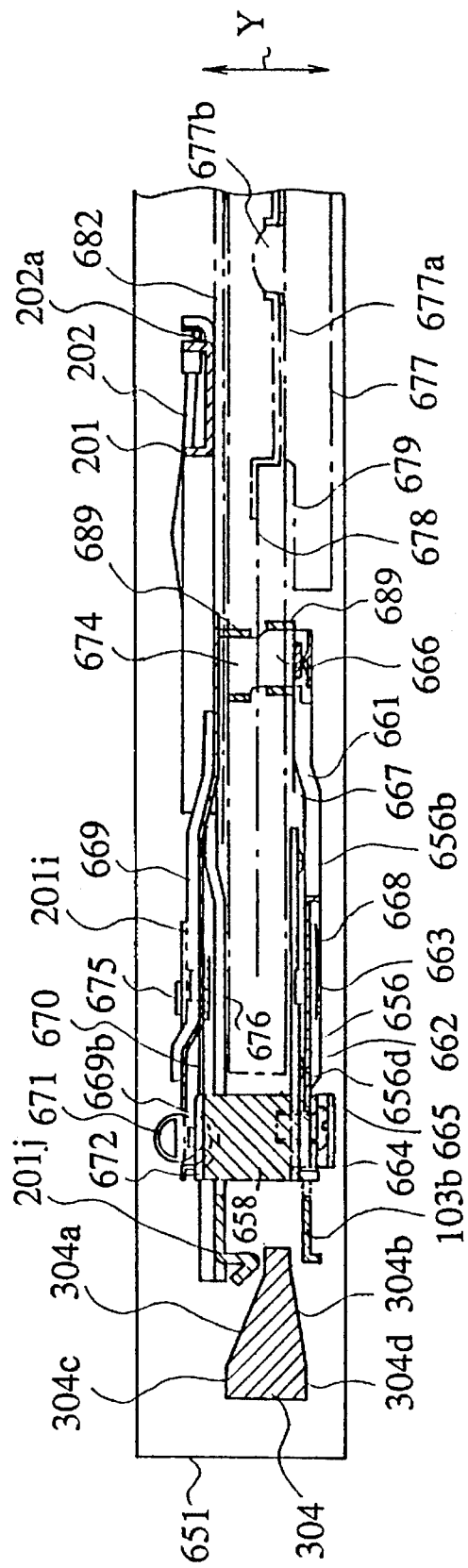
FIG. 23 is a side sectional view showing principal parts of FDD.
Figure 24:
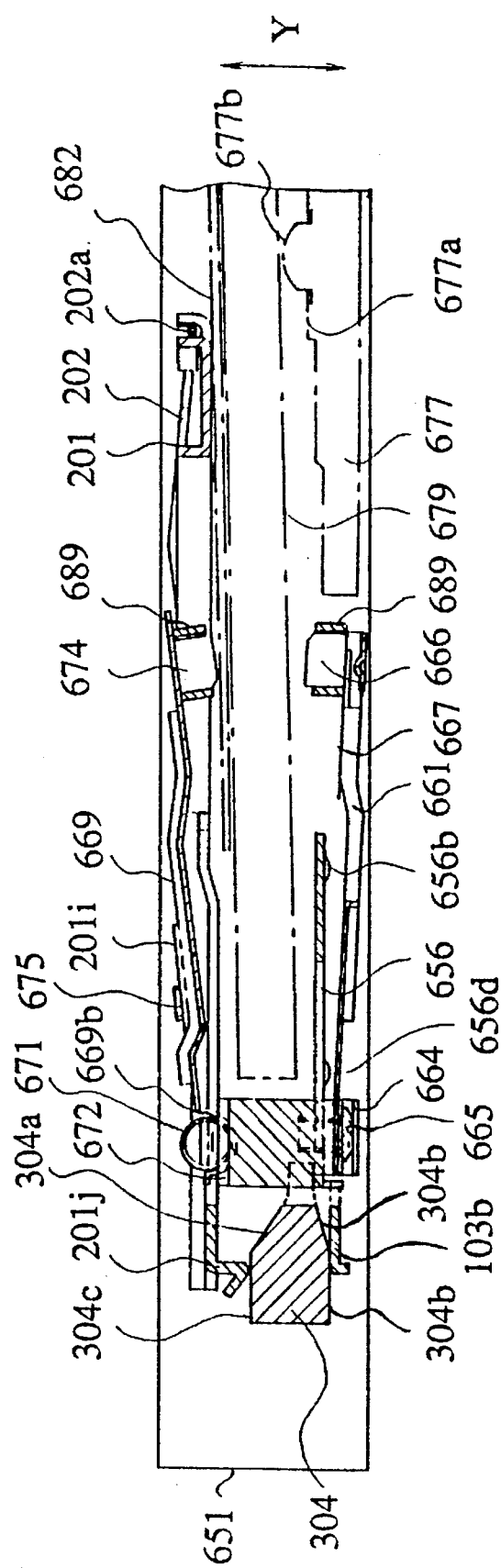
FIG. 24 is a side sectional view where some parts are eliminated from FIG. 22.
Figure 25:
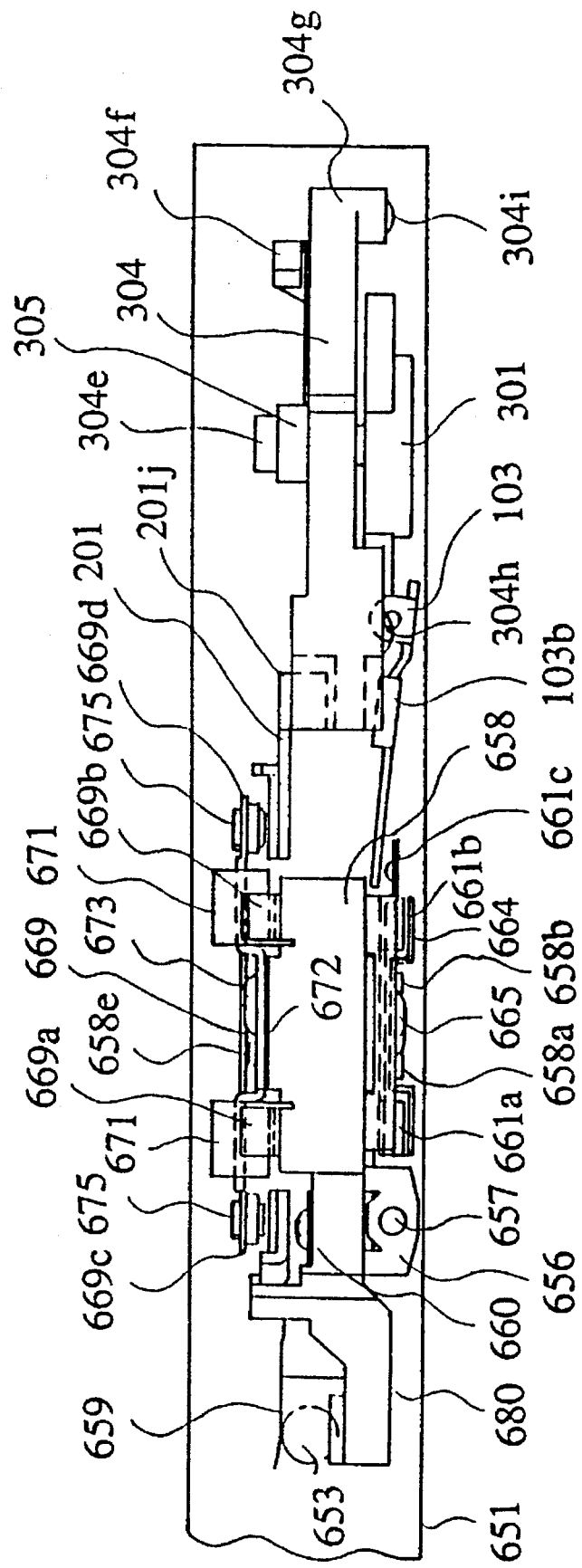
FIG. 25 is a back side view of FDD.

FIG. 19–FIG. 25 shows a seventh embodiment of the present invention. FIG. 19 is a plan view of FDD in which the diskette is loaded. FIG. 20 is a plan view of principal parts of FDD in which the diskette is loaded. FIG. 21 is a plan view of principal parts of FDD where the S1 arm and S1 arm avoiding mechanism are eliminated from FIG. 20. FIG. 22 is a plan view of FDD in which the diskette is unloaded. FIG. 23 is a side sectional view showing principal parts of FDD. FIG. 24 is a side sectional view where some parts are eliminated from FIG. 22. FIG. 25 is a back side view of FDD.

In the figure, 651 is a frame, 652 is a stepping motor and 653 is a needle screw. The stepping motor 652 transmits the torque to the needle screw 653 through gears 654 and 655. 656 is a carriage base supported by the guide rod 657. 658 is an arm base having a needle portion engaging the needle screw 653 and fixed on the carriage base 656. 659 is a needle pressure spring fixed on the arm base 658 by the screw 660 which gives pressure to engaging portion of the needle portion. That is, the carriage base 656 can move in the X1, X2 direction by the needle screw 653 and the guide rod 657.

661 is an S0 arm fixed to the arm base 658 with an S0 arm pressure spring 663 through an S0 arm stationary board 664 by a screw 665. The S0 arm 661 is able to turn toward the Y direction by an S0 arm supporting spring 662. 666 is an S0 head mounted on the tip portion of the S0 arm 661 through a gimbal spring 667. The S0 arm 661 is pressed to the S0 convex portions 656a, 656b, 656c and 656d by the S0 arm pressure spring 663 while the disk is being loaded. The S0 convex portion is used for positioning the frame 651 of the S0 arm 661 which is mounted on the carriage base 656. Curl shape S0 rotational supporting points 661a, 661b are provided on the S0 arm 661 and will be supporting points when the S0 arm 661 rotates toward Y direction. The S0 arm supporting spring 662, the S0 arm pressure spring 663 and the S0 arm stationary board 664 are positioned by the lower protruding portions 658a and 658b. 668 is a stationary board for fixing the S0 arm supporting spring 662 to the S0 arm 661.

669 is an S1 arm fixed to the arm base 658 by a screw 673 through an S1 arm stationary board 672 which supports an S1 head pressure spring 671. The S1 arm 669 is able to turn toward the Y direction by an S1 arm supporting spring 670. 674 is an S1 head provided at the tip of S1 arm 669. Curl shape S1 arm supporting points 669a and 669b are provided on the S1 arm 669 and will be supporting points for positioning the S1 arm 669 toward the thickness direction of the frame 651 when the disk is loaded, and will be rotational supporting points of the S1 arm 669 when the disk is unloaded. When the disk is loaded, the outside of the S1 arm supporting points 669a and 669b contact the receiving portions for the S1 supporting points 658c and 658d which are provided on the upper portion of the arm base 658. At the inner side of the S1 arm supporting points 669a and 669b, the S1 head pressure spring 671 is inserted into the S1 arm stationary board 672 and become supporting points of the S1 arm 669 toward the Y direction when disk is unloaded. 675 are S1 arm adjusting screws provided at blades 669c and 669d which are provided at both sides of the S1 arm 669. A pressure side arm 671a of the S1 arm pressure spring 671 contacts the blades 669c and 669d through both sides of the S1 arm 669. S1 arm supporting spring 670 and S1 arm stationary board 672 are positioned by the upper protruding portion 658e of the arm base 658 and a screw 673. 676 is a stationary board for fixing the S1 arm supporting spring 670 to the S1 arm 669.

The S0 head 666 and S1 head 674 are arranged to be facing each other when the disk is loaded. The S1 head pressure spring 671 causes the S1 head 674 to contact to the disk 678 with desired pressure. The disk 678 is a recording medium mounted on the disk mounting surface 677a of the spindle motor 677 which is provided in the frame 651. The S0 arm pressure spring 663 causes the S0 arm 661 to contact the S0 convex portions 656a, 656b, 656c and 656d with desired pressure so that the S0 arm 661 does not displace or incline, if the S1 head pressure spring 671 applies a pressure or an impact to the tip of the S0 arm 661 through S0 head 666 when the disk is loaded. 679 is a diskette comprised of a disk 678, a jacket case having a window for recording and reproducing the data and for protecting the disk, and a shutter for opening and closing the window. 689 are shield rings for protecting the S0 head 666 and the S1 head 674 from the outer magnetic disturbance. The stepping motor 652 causes the carriage 680 in the X1, X2 direction. The carriage 680 comprises the carriage base 656, the arm base 658, the needle pressure spring 659, the screw 660, the S0 arm 661, the S0 arm supporting spring 662, the S0 arm pressure spring 663, the S0 arm stationary board 664, the screw 665, the S0 head 666, the gimbal spring 667, the stationary board 668, the S1 arm 669, the S1 arm supporting spring 670, S1 head pressure spring 671, S1 arm stationary board 672, the screw 673, the S1 head 674 and the stationary board 676.

681 is a TK sensor for detecting the reference point (track 00 of the disk 678) of carriage 680. 682 is a disk holder for positioning the diskette 679 in a predetermined position, which goes up and down to the disk insertion position and the disk mounting position. That is, the disk holder 682 loads or unloads the diskette 679. 683 is a slide board having a disk ejection button 684 at a front portion of the FDD, which slides freely toward the X1, X2 direction between the frame 65 1 and the disk holder 682. 685 is a slide pressure spring for pressing the slide board 683 toward the X1 direction. The disk holder 682 moves between the disk inserting position and the disk mounting position when the slide board 683 moves toward the X1, X2 direction by the cam construction (not shown in the figure) which is mounted on the slide board. 686 is a latch lever for holding the slide board 683 in a predetermined position when the disk holder 682 is at the disk insertion position, and for opening and closing the shutter of the diskette 679. 687 is a pressure spring with latch lever for pressing the latch lever 686 to a predetermined direction. The disk holder 682 is at the disk mounting position, that is, the loading position, when the slide board 683 is at the X1 position. When the slide board 683 is at the X2 position, the disk holder is at the disk insertion position, that is, the unloading position, and the slide board 683 engages the latch lever 686. 686 is a front panel.

101 is an S0 avoiding holder which is fixed to the frame 651 by the screw 102 and positioned by the protruding portions 651a and 651b. 103 is an S0 arm, one end of which is pressed to the groove 651c of the frame 651 by a rod pressing portion 101a of the S0 avoiding holder 101, the other end of which is supported by the avoiding rod 104 which is pivotally connected to the rod receiving portion 101b of the S0 avoiding holder 101. 105 is a S0 avoiding arm pressure spring which presses the S0 avoiding arm 103, which is positioned by the protruding portion 101c of the S0 avoiding holder 101 and fixed by the screw 106, toward the S1 head 674. The S0 avoiding arm 103 limits its rotating angle within a predetermined angle by a stopper 101 d provided at the S0 avoiding holder 101. A tip portion 103a of the S0 avoiding arm 103 does not contact the avoiding arm receiving portion 661c provided on the S0 arm 661 when the disk is loaded. When the disk is unloaded, the tip portion 103a is pressed to the avoiding arm receiving portion 661c by the S0 avoiding arm 103 rotating on the pivoting axis of the avoiding rod 104. By this movement, the S0 arm 661 rotates in the Y direction and the S0 head 666 is prevented from contact with the diskette 679 as shown in FIG. 24.

201 is a U-shaped S1 avoiding arm, the bottom of which is supported by the axis portion of the S1 avoiding arm pressure spring 202. Therefore the U-shaped S1 avoiding arm 201 can rotate against the disk holder 682. The rotating direction of the S1 avoiding arm 201 is the Y direction and the same direction as that of the S1 arm 669. The axis portion 202a of the S1 avoiding arm pressure spring 202 is positioned and held by holding the arc portions 202b and 202c in the spring receiving portions 682a, 682b, 682c and 682d of the disk holder 682. The positioning of the S1 avoiding arm 201 toward the X1 and X2 direction is carried out by holding the axis portion 202a between the bottom walls 201a, 201b, 201c and the side walls 201d, 201e of the S1 avoiding arm 201. The positioning of the S1 avoiding arm 201 perpendicular to the X1 and X2 direction is carried out by holding the side walls 201f and 201g of the S1 avoiding arm 201 between the arm holding portions 682e and 682f of the disk holder 682. The axis portion 202a of the S1 avoiding arm pressure spring 202 is pressed toward the disk mounting position so that the bottom portion supported by the axis portion 202a of the S1 avoiding arm 201 does not lift over the disk holder 682. The S1 avoiding arm 201 is pressed toward the disk mounting position by the spring portions 202d and 202e. 201h and 201i are S1 arm receiving portions attached at both sides of the S1 avoiding arm 201 which are adjusted by the S1 arm adjusting screws 675 provided at the blades 696c and 696d of the S1 arm 669. The S1 arm receiving portions 201h and 201i push the adjusting screw 675 and lift the S1 arm upwardly as shown in FIG. 24 so that the S1 head 674 does not contact the diskette 679, when the disk holder 682 is at the disk insertion position, that is, the unloading position. When the disk holder 682 is at the disk mounting position, that is, loading position, the S1 arm receiving portions 201h and 201i are arranged so that they do not contact the S1 arm adjusting screw 675.

301 is an oil damper, having an avoiding lever 304 fixed on the frame 651 by the screws 302 and 303, which gives a reaction force against rotation of the avoiding lever 304. The S1 avoiding lever 304 comprises an S1 oblique portion 304a which lifts the S1 lever contact portion 201j, which is mounted at the tip portion of the S1 avoiding arm 201, to the upper position, by the rotation toward the Q1 direction of the avoiding lever 304. The S1 avoiding lever 304 also comprises an S0 oblique portion 304b which pushes down the S0 lever contact portion 103b which is mounted at the end of the S0 avoiding arm 103. When the disk is loaded, the S1 lever contact portion 201j and the S0 lever contact portion 103b are arranged so that they do not contact with the avoiding lever 304 as shown in FIG. 23. When the disk is unloaded, the S1 lever contact portion 201j and the S0 lever contact portion 103b are arranged so that they are put on flat portions 304c and 304d of the avoiding lever 304. That is, the S0 avoiding arm 103 and S1 avoiding arm 201 rotate according to the rotation of the avoiding lever 304 toward the Q1 direction, then, at unloading state, the S0 arm 661 and S1 arm 669 rotate toward the Y direction so that the S0 head 666 and S1 head 674 do not contact the diskette 679. 305 is an avoiding lever pressure spring which engages the spring supporting portion 304e of the avoiding lever 304, one end of which contacts the spring receiving portion 304f of the avoiding lever 304, and the other end contacts the spring receiving portion 651d of the frame 651 and presses the avoiding lever 304 toward the Q2 direction. The avoiding lever 304 rotates toward the Q1 direction by pushing the slide board contact portion 304g of the avoiding lever 304 toward the X2 direction by the avoiding lever contact portion 683a mounted at the end portion of the slide board 683. That is, the avoiding lever 304 rotates in association with the movement of disk ejection button 684 toward the X2 direction. 304h and 304i are sliding points provided at a side against the frame 651 at the avoiding lever 304.

At the disk inserting position, the disk holder 682 is arranged so that the diskette 679 is inserted obliquely for a predetermined angle downwardly from the front panel 688 to the deep position against the disk mounting surface 677a of the spindle motor 677 as shown in FIG. 24. At the disk mounting position, the disk holder 682 is arranged so that the disk 678 is mounted on the disk mounting surface 677a as shown in FIG. 23.

The operation of the seventh embodiment is explained here. While the disk holder 682 is at the disk insertion position, that is, at the unloading state, and the S0 head 666 and S1 head 674 are at the avoiding state as shown in FIG. 24, when the diskette 679 is inserted into the disk holder 682, the shutter (not shown) of the diskette 679 is opened by the latch lever 686. When the latch lever 686 turns to the state shown in FIG. 19, the engagement between the slide board 683 and the latch lever 686 is released, the slide board 683 moves toward X1 direction, then the disk holder 682 moves instantly to the disk mounting position as shown in FIG. 23, and the disk holder 678 is mounted on the spindle motor 677. At this time, since the avoiding lever 304 receives a reaction force from the oil damper 301, the avoiding lever 304 is at the position shown in FIG. 22 and FIG. 24, and the S0 head 666 and the S1 head 674 are at the avoiding position as shown in FIG. 24. At this time, the slide board contact portion 304g of the avoiding lever 304 is spaced from the avoiding lever contact portion 683a of the slide board 683.

The avoiding lever 304 slowly rotates toward the Q2 direction by the pressure of the avoiding lever pressure spring 305, and the S0 arm 661 and S1 arm 669 slowly rotate toward the disk 678 (arrow Y direction). Then the S0 head 666 and S1 head 674 closely contact the disk 678 by the pressure of the S1 head pressure spring 671. Therefore it is available to record and reproduce the data. The avoiding lever 304 turns toward the Q2 direction until the slide board contact portion 304g contacts to the avoiding lever contact portion 683a.

For unloading movement for ejecting the diskette 679, the disk holder 682 moves up to the disk insertion position in association with movement of the slide board 683 toward the X direction by pushing the disk ejection button 684 toward the X2 direction. The avoiding lever 304 turns toward the Q1 direction by being pushed toward the X2 direction by the avoiding lever 683a. By the turn of the avoiding lever 304, S0 avoiding arm 103 and the S1 avoiding arm 201 turn according to the S1 oblique portion 304a and S0 oblique portion 304b. Therefore the S0 arm 661 and the S1 arm 669 turn toward the avoiding direction (the Y direction), and the S0 head 666 and S1 head 674 remove from the disk 678. Since bottom side of the S1 avoiding arm 201 is supported by the axis portion 202a of the S1 avoiding arm pressure spring 202, the bottom side goes up together with lift of the disk holder 682. Since the S1 avoiding arm 201 lifts the bottom side and the S1 avoiding lever contact portion 201j mounted at the tip portion almost at the same time, the S1 arm 669 is avoided with stability. When the slide board 683 moves to the predetermined position, the slide board 683 engages with latch lever 686 and is held by the latch lever 686 at X2 position. During the process when the latch lever 686 and the slide board 683 are engaging, the diskette 679 is ejected by the rotation of the latch lever 686. The engagement of the latch lever 686 and the slide board 683 is carried out after the disk holder 682 has been lifted up to the disk insertion position.

As described above, the S0 head 666 and the S1 head 674 can avoid by the avoiding lever 304 having the S1 oblique portion 304a and S0 oblique portion 304b which interlock with the slide board 683 having the disk ejection button 684. Therefore avoiding operation is carried out with certainty. Since the avoiding lever 304 and the oil damper 301 are connected together, the S0 head 666 and the S1 head 674 can slowly go down on the disk 678 when the disk is loaded. Since the angle of the S1 oblique portion 304a and S0 oblique portion 304b is less than 45 degrees, the landing time is proportional to the torque of the oil damper 301 and the spring force of the avoiding lever pressure spring 305. Therefore the landing time when the S0 head 666 and the S1 head 674 goes down to the disk 678 can be easily set to a desired value. Since the S1 head pressure spring 671 for contacting the S1 head 674 to the disk 678 with pressure is provided in the S1 arm supporting points 669a and 669b of the S1 arm 669, the depth dimension of the FDD can be short without causing the S1 head pressure spring 671 to extrude from the carriage 680 except for a part of it.

Eighth embodiment

Figure 26:
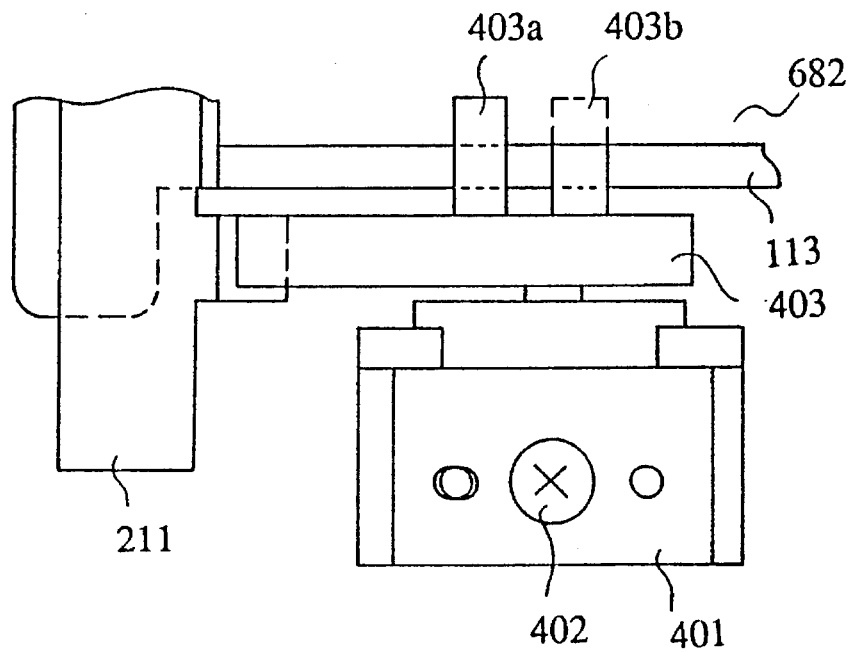
FIG. 26 is a principal plan view of other embodiment.
Figure 27:
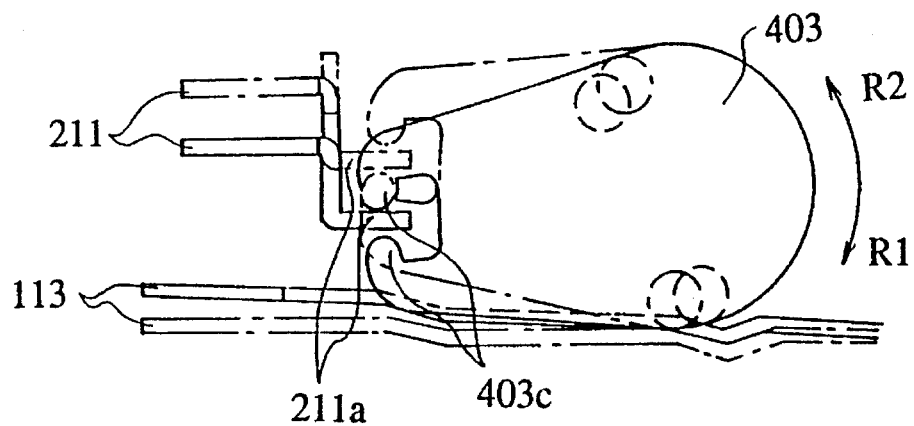
FIG. 27 is a front view of FIG. 26.

FIG. 26 is a principal plan view of an eighth embodiment. FIG. 27 is a front view of FIG. 26. In the above embodiments, the avoiding lever 304 moves by the slide board 683. But, as shown in FIG. 26 and FIG. 27, it is also available to cause the S0 avoiding arm 113 and the S1 avoiding arm 211 to turn by the avoiding lever 403 which is driven by the up and down movement of the disk holder 682 according to the loading and unloading. In this case, the same effect is obtained. S0 avoiding arm 113 and the S1 avoiding arm 201 are mounted in the same way as that of the S0 avoiding arm 103 and S1 avoiding arm 201 as described above. In the figures, the solid line shows a loading state and the chain line shows an unloading state.

In the figure, 401 is an oil damper fixed to the frame 651 by the screw 402 and having avoiding lever 403. 403a is a disk holder contact portion attached at the avoiding lever 403 on the surface of the disk holder. 403b is an S0 avoiding arm contact portion attached at the avoiding lever 403 on the S0 avoiding arm 113. 403c are S1 avoiding arm contact portions attached at the end of the avoiding lever 403. The S1 avoiding arm contact portions are arranged so that they put the L-shaped avoiding lever contact portion 211a of the S1 avoiding arm 211 between themselves. The avoiding lever 403 is pushed toward the R2 direction by the avoiding lever pressure spring (not shown in the figure).

When the disk holder 682 is at the disk mounting position, that is, the loading state, the position of the avoiding lever 403 is shown by the solid line. In this state, the S0 avoiding lever 113 does not contact the avoiding arm receiving portion 661c, and the S1 avoiding arm 211 does not contact the S1 arm adjusting screw 675 attached on the S1 arm 669.

When the disk holder 682 is at the disk inserting position, that is, the unloading state, the position of the avoiding lever 403 is shown by the chain line. In this state, the avoiding lever 403 turns toward the R1 direction by lifting the disk holder 682, thereby the S0 avoiding lever 113 turns toward the state shown by the chain line corresponding to the S0 avoiding arm contact portion 403b. Then the S0 avoiding lever 113 pushes the S0 avoiding arm receiving portion 661c and causes the S0 arm 661 to turn toward the avoiding position. According to the rotation of the avoiding lever 403 toward R1 direction, the S1 avoiding arm 211 is lifted toward the chain line by the S1 avoiding arm contact portion 403c of the avoiding lever 403. The S1 avoiding arm 211 lifts the S1 adjusting screw 675 and causes the S1 arm 669 to turn toward the avoiding position.

The disk holder 682 moves instantly from the disk insertion position to the disk mounting position in the same way described in the above embodiments. But, the avoiding lever 403 moves slowly toward the R2 direction against the reaction force of the oil damper 401. Since the S0 avoiding arm 113 and the S1 avoiding arm 211 turn according to the movement of the avoiding lever 403, the S0 arm 661 and S1 arm 669 slowly turn and then the S0 head 666 and S1 head 674 go down slowly to the disk 678.

In this embodiment, the disk holder 682 causes the avoiding lever 403 to drive, thereby the S0 avoiding arm 113 and S1 avoiding arm 211 turn, and the S0 and 661 and S1 arm 669 turn. Therefore, the same effect can be obtained in this embodiment as that in the above described embodiments.

In the above embodiment, the S0 head 66 and the S1 head 674 are avoided at the same time. But, it is able to provide either an avoiding mechanism using S0 head 666 or an avoiding mechanism using only S1 head 674. If it does not need to provide a soft landing mechanism, the oil dampers 301 and 401 can be omitted.

Ninth embodiment

Figure 28:
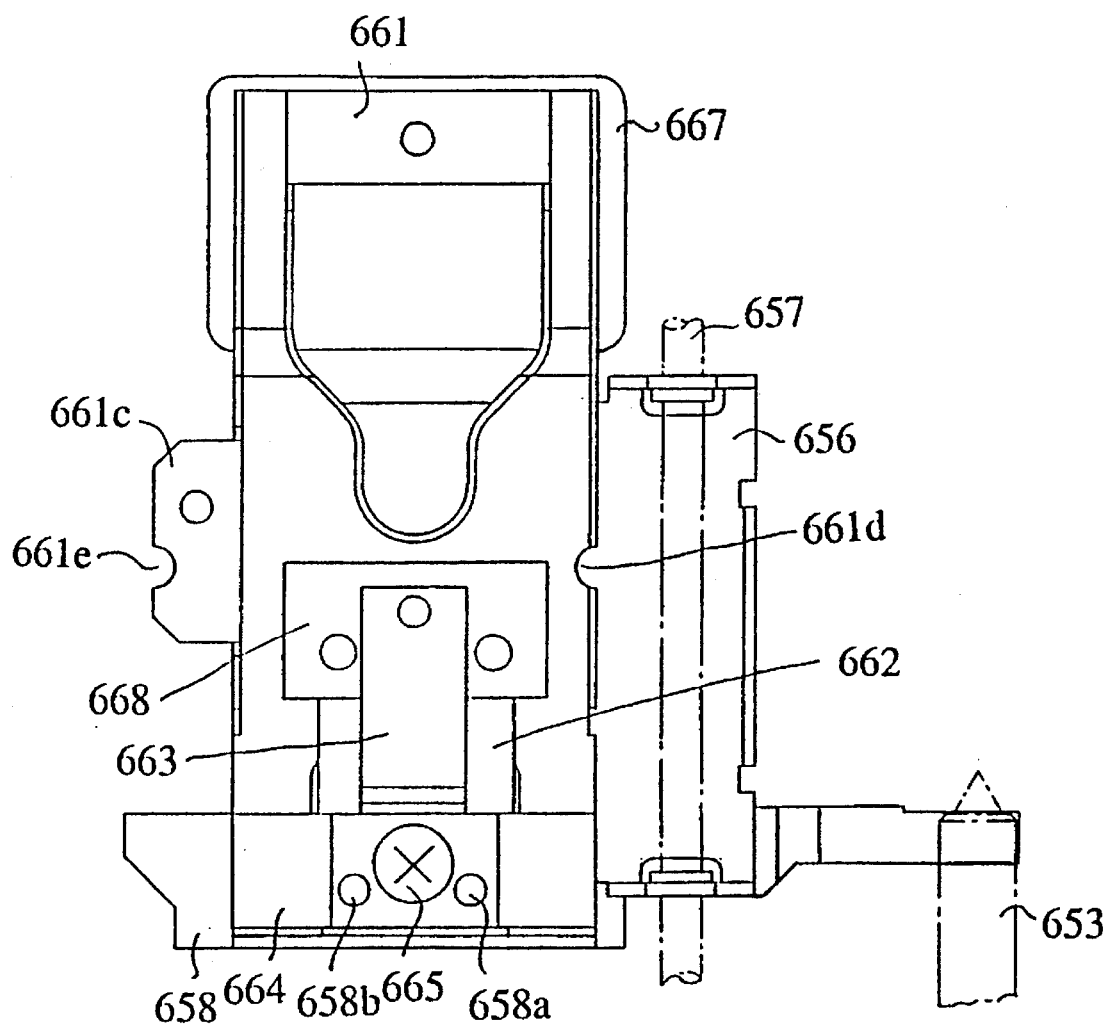
FIG. 28 is a principal bottom view of other embodiment.
Figure 29:
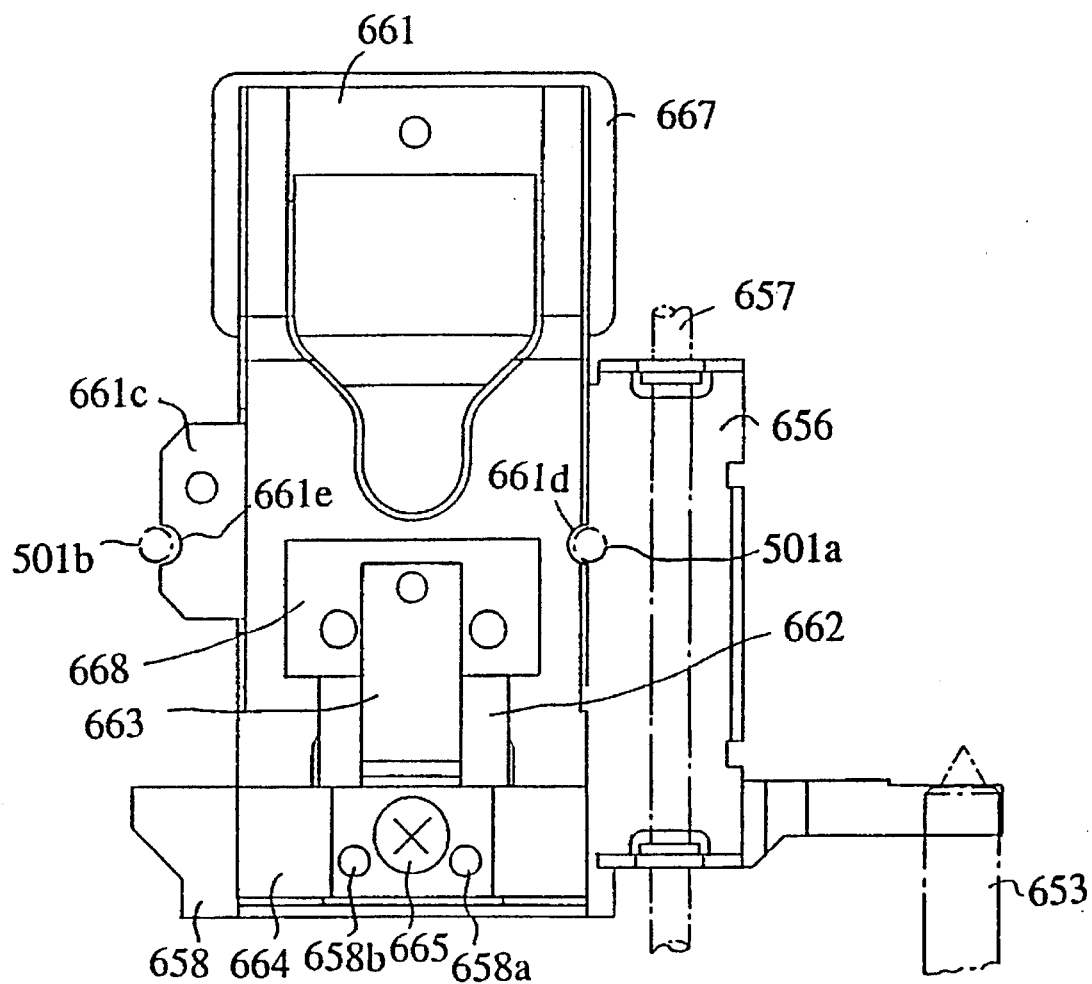
FIG. 29 is a principal bottom view showing an adjusting method of FIG. 28.
Figure 30:
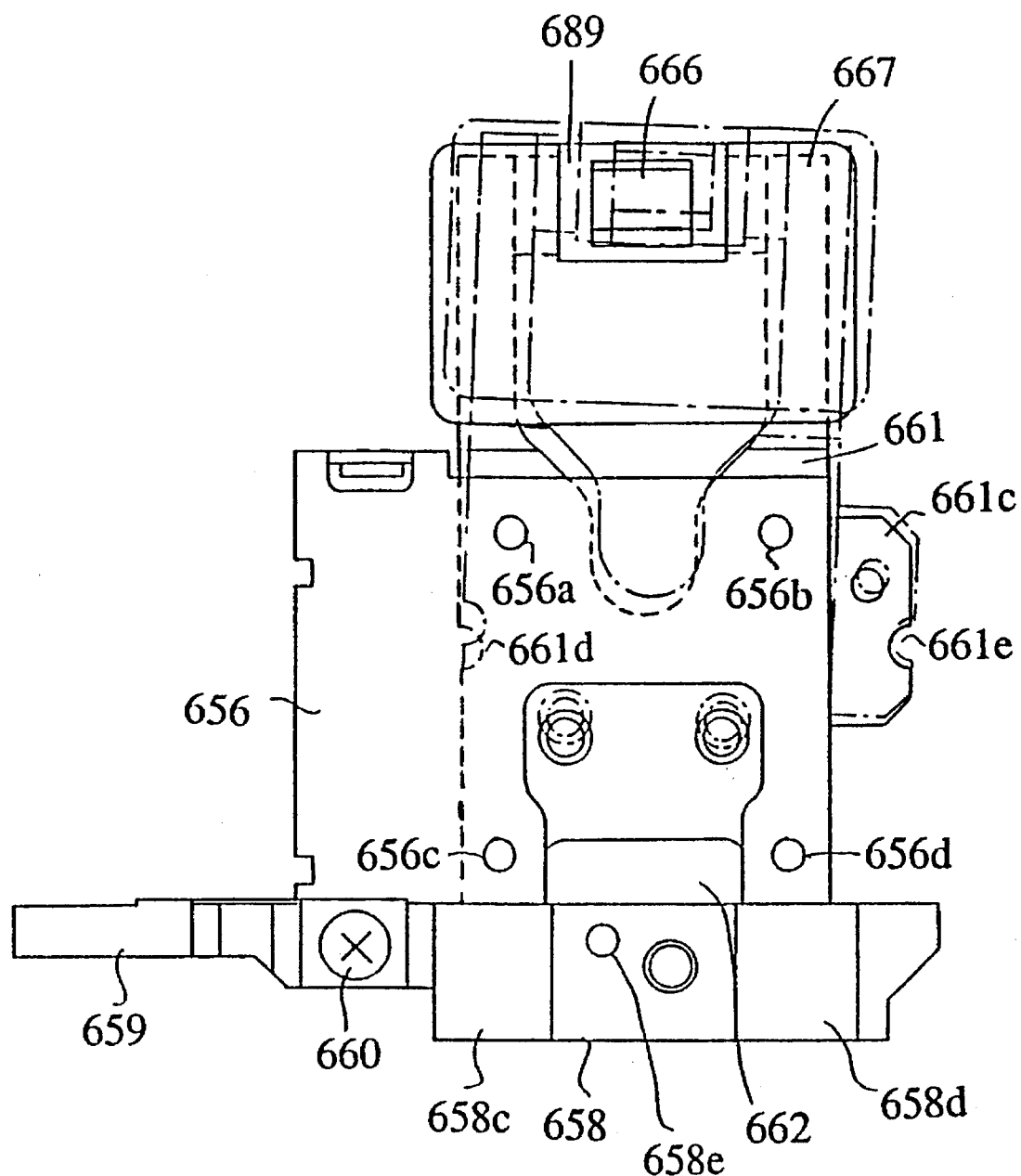
FIG. 30 is a principal plan view showing an adjusting state of FIG. 28.
Figure 31:
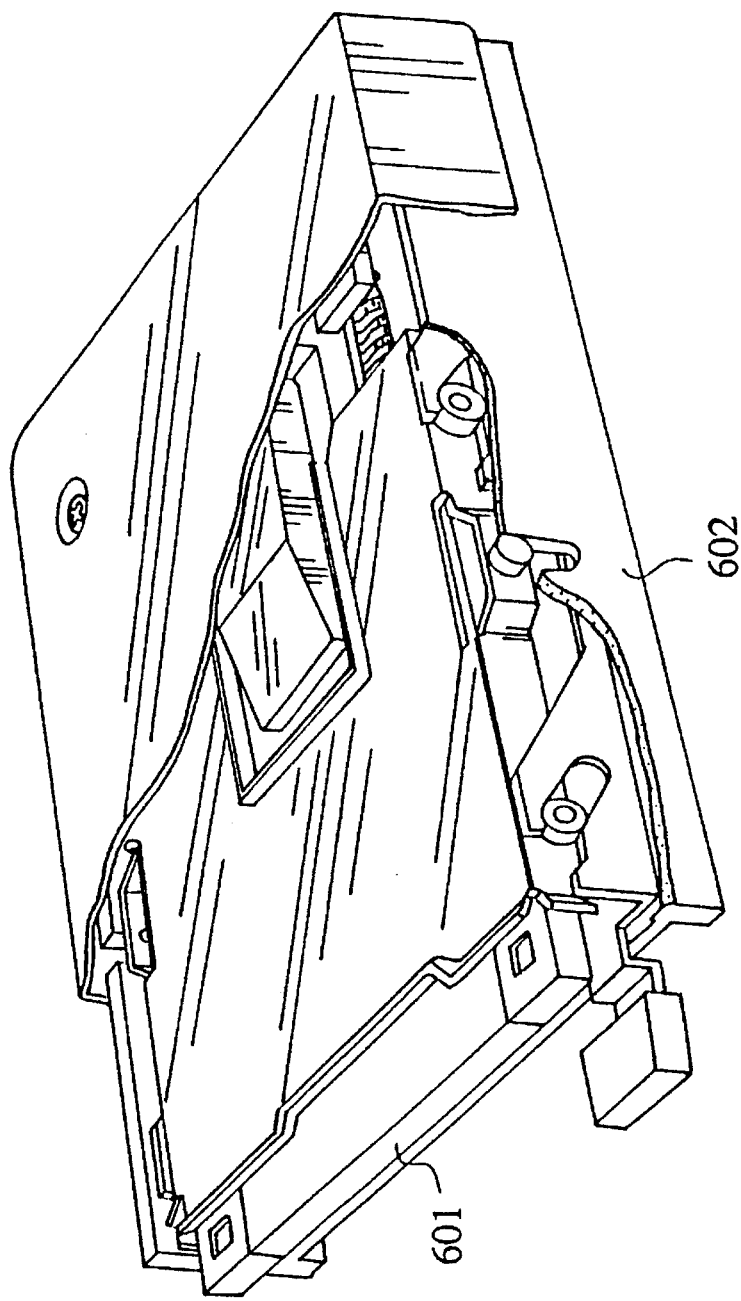
FIG. 31 is a perspective view of the conventional FDD.
Figure 32:
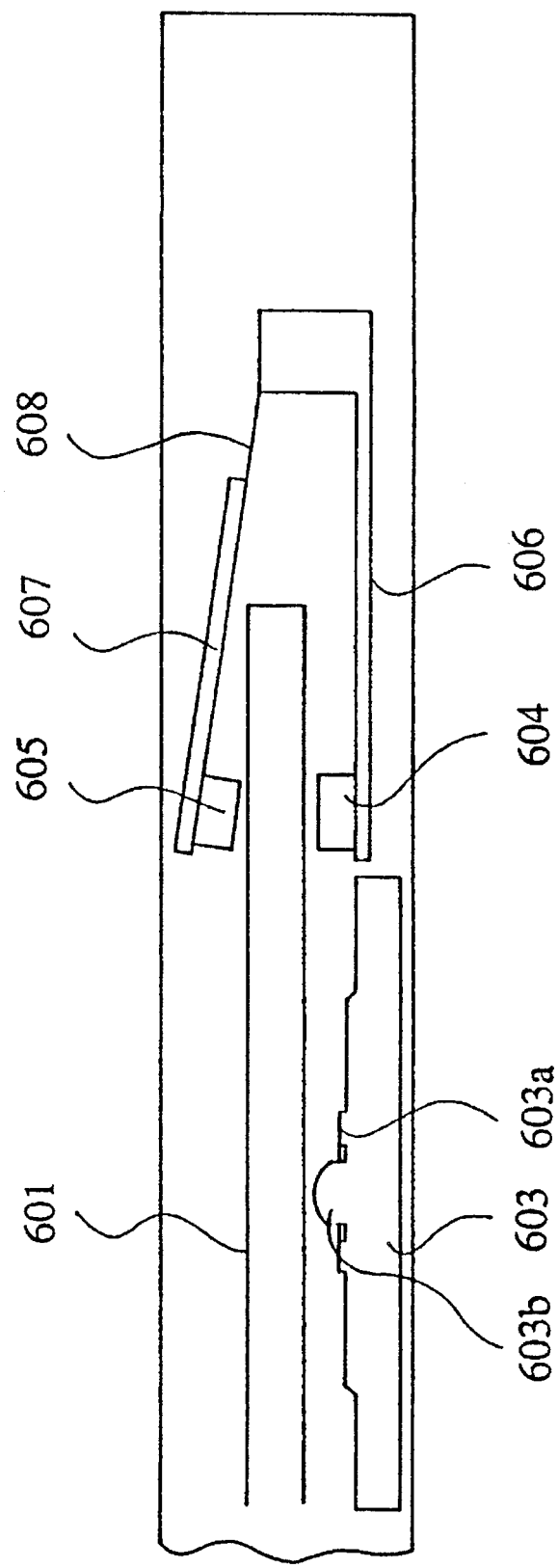
FIG. 32 is a principal sectional view of FIG. 31.
Figure 33:
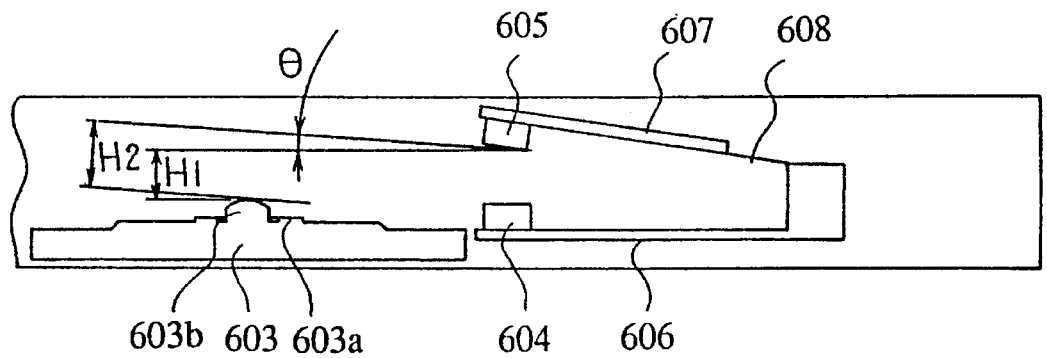
FIG. 33 is a principal sectional view of FIG. 31 where a diskette is inserted obliquely.
Figure 34:
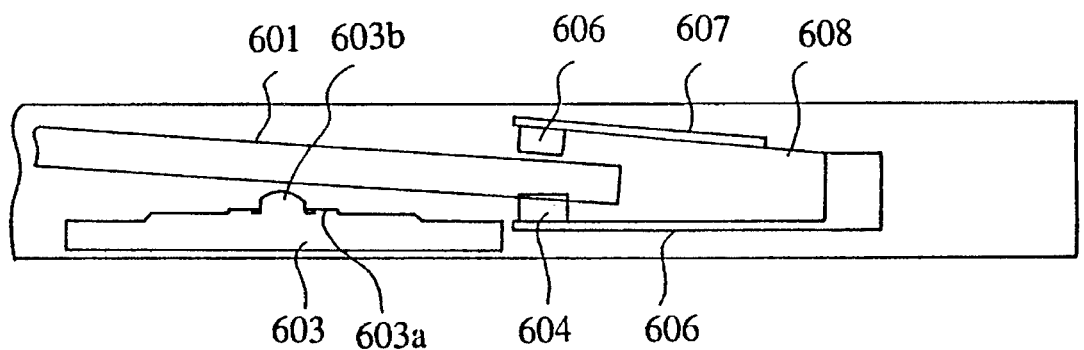
FIG. 34 is a principal sectional view where a diskette is inserted obliquely and also shows a problem occurred therewith.

FIG. 28 is a principal bottom view of a ninth embodiment. FIG. 29 is a principal bottom view showing an adjusting method of FIG. 28. FIG. 30 is a principal plan view showing an adjusting state of FIG. 28. FIG. 31 is a perspective view of the conventional FDD. FIG. 32 is a principal sectional view of FIG. 31. FIG. 33 is a principal sectional view of FIG. 31 where the diskette is inserted obliquely. FIG. 34 is a principal sectional view where the diskette is inserted obliquely and shows a problem which occurred therewith. The same numeral numbers as that of the above embodiments refer to the same elements or members having the same functions. Therefore the detailed explanation is omitted.

In the above embodiments, the S0 arm 661 holding the S0 head 666 is positioned by the lower protruding portions 658a and 658b attached on the arm base 658, and is fixed by the S0 arm stationary board 664 and screw 665. But, it is able to loosen the engagement between the S0 arm supporting spring 662 and the lower protruding portions 658a, 658b and screw 665, and adjust a relative position between the S0 head 666 and the disk 678 or the S1 head 674. Making the S0 arm 661 adjustable does not lose the above effect. On the contrary, by making the relative position adjustable between the S0 head 666 and disk 678 or S1 head 674, a reliability of the apparatus increases.

The ninth embodiment of the present invention is explained here. In the figure, 661d and 661e are notch portions for adjusting S0 arm 661 provided at the side of S0 arm 661.

As shown in FIG. 29, the notch portions 661d and 661e are handled by the adjusting arm 501a and 501b of the S0 arm adjusting apparatus (not shown in the figure). By shifting the S0 arm 661 as shown in FIG. 30, the S0 head 666 can be adjusted. In the figure, the chain line shows a state before adjusting the S0 arm 661, and the solid line shows a state after adjusting the S0 arm 661. By fastening the screw 665 after adjusting, the S0 arm 661 can be fixed on the arm base 658. As described above, by shifting the S0 arm 661, the position of the S0 head 666 and the disk 678 or the S1 head 674 can be adjusted. Therefore the recording and reproducing characteristics of the apparatus and the compatibility can be improved.

What is claimed is:

1. A magnetic disk apparatus including a frame and having an upper head and a lower head at a facing position of a head arm and a head carriage, respectively, said head arm is rotatably mounted on the frame and can rotate between a lower position where the heads are able to write and read to/from a disk and an upper position where the heads are remotely located from the disk, and spring means, coupled to the head arm, for urging the head arm to the lower position, the apparatus comprising:

an arm load board, movably attached to the frame, the arm load board movable between an upper supporting position during which the arm load board is in contact with and supports the head arm away from the lower position of the head arm, and a lower non-supporting position during which the head arm is no longer in contact with the arm load board; and damper means, coupled to the arm load board, for urging the arm load board away from its lower non-supporting position such that the arm load board moves slowly from its upper supporting position to its lower non-supporting position;

wherein the arm load board moves from its upper supporting position to its lower non-supporting position against the force of the damper means so as to slowly and consistently support movement of the head arm between its upper and lower positions.

2. A magnetic disk apparatus of claim 1:

wherein said arm load board is U-shaped, the bottom portion of said arm load board is axially supported on a disk holder, both sides of said arm load board have head arm adjusting screws thereon which contact the arm load board.

3. A magnetic disk apparatus of claim 1 wherein the arm load board is located beneath the head arm between the head arm and the frame when the head arm is in its upper position.

4. A magnetic disk apparatus as claimed in claim 1 further including a head arm adjusting screw, attached to the head arm, and contacting the arm load board when the head arm and the arm load board are in their respective upper positions.

5. A magnetic disk apparatus as claimed in claim 4 wherein the arm load board rotates between its upper supporting position and its lower non-supporting position.

6. The magnetic disk apparatus as claimed in claim 5 wherein an axis of rotation of the arm load board is opposite to an axis of rotation of the head arm such that the head arm and the arm load board rotate toward one another when moving from their respective upper positions to their respective lower positions.

7. A magnetic disk apparatus comprising:

a frame;

a head arm, including a reading/writing head thereon, rotatably connected to the frame and having an upper position, during which reading and writing to a disk cannot occur, and a lower position, during which reading and writing to the disk can occur;

an arm load board, movably connected to the frame, the arm load board being movable between an upper supporting position, during which the head arm is supported by and in contact with the arm load board, and a lower non-supporting position, during which the head arm is not in contact with the arm load board; and an urging mechanism, coupled to the arm load board, urging the arm load board away from its lower non-supporting position such that the arm load board consistently moves slowly from its upper supporting position to its lower non-supporting position;

wherein the arm load board moves from its upper position to its lower position against the force of the urging mechanism so as to slowly and consistently support movement of the head arm between its upper and lower positions.

8. The magnetic disk apparatus as claimed in claim 7 wherein the head arm includes at least one adjusting screw thereon for contacting the arm load board when the head arm is in its upper position and the arm load board is in its upper supporting position.

9. The magnetic disk apparatus as claimed in claim 8 wherein the arm load board is substantially U-shaped.

10. The magnetic disk apparatus as claimed in claim 9 wherein the arm load board is rotatably connected to the frame and rotates between its upper supporting position and its lower non-supporting position.

11. The magnetic disk apparatus as claimed in claim 10 wherein the arm load board is located beneath and supports the head arm when the head arm is in its upper position.

12. A magnetic disk apparatus comprising:

a frame;

means, including a reading/writing head thereon, rotatably connected to the frame, for rotating between an upper position, during which reading and writing cannot occur, and a lower position, during which reading and writing can occur;

means, movably connected to the frame, for moving between an upper supporting position, during which the means for rotating is supported by and in contact with the means for moving and a lower non-supporting position, during which the means for rotating is not in contact with the means for moving; and means, coupled to the means for moving, for urging the means for moving away from its lower non-supporting position such that the means for moving consistently moves slowly from its upper supporting position to its lower non-supporting position;

wherein the means for moving moves from its upper supporting position to its lower non-supporting position against the force of the means for urging so as to slowly and consistently support movement of the means for rotating from its upper position to its lower position.

13. The magnetic disk apparatus as claimed in claim 12 wherein the means for moving is rotatably connected to the frame such that it rotates between its upper supporting position and its lower non-supporting position.

14. The magnetic disk apparatus as claimed in claim 13 wherein the means for moving is located beneath the means for rotating such that it supports the means for rotating when the means for rotating is in its upper position.

\* \* \* \* \*